United States Patent
Iizuka et al.

(10) Patent No.: US 6,191,792 B1
(45) Date of Patent: Feb. 20, 2001

(54) SCHEME FOR AUTOMATIC DATA CONVERSION DEFINITION GENERATION ACCORDING TO DATA FEATURE IN VISUAL MULTIDIMENSIONAL DATA ANALYSIS TOOL

(75) Inventors: Yuichi Iizuka; Seiji Isobe; Kiyoshi Kurokawa; Hisako Shiohara; Tetsuya Iizuka, all of Tokyo (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 09/021,572

(22) Filed: Feb. 10, 1998

(30) Foreign Application Priority Data

Feb. 10, 1997 (JP) .................................................. 9-026900
Feb. 12, 1997 (JP) .................................................. 9-027990
Jun. 18, 1997 (JP) .................................................. 9-161370

(51) Int. Cl.[7] .............................. G06T 11/40; G06T 11/00
(52) U.S. Cl. ......................................... 345/429; 345/433
(58) Field of Search ................................ 345/326, 419, 345/420, 424, 427, 440, 345, 429, 430, 431, 432, 433; 707/6, 102

(56) References Cited

U.S. PATENT DOCUMENTS

| | | | |
|---|---|---|---|
| 5,228,119 | * 7/1993 | Mihalisin et al. | 395/118 |
| 5,420,968 | * 5/1995 | Johri | 395/133 |
| 5,574,889 | * 11/1996 | Jindo et al. | 395/500 |
| 5,619,709 | * 4/1997 | Caid et al. | 395/794 |
| 5,632,009 | * 5/1997 | Rao et al. | 395/770 |
| 5,664,174 | * 9/1997 | Agrawal et al. | 395/606 |
| 5,883,635 | * 11/1996 | Rao et al. | 345/440 |

OTHER PUBLICATIONS

Keim et al., "VisDB: database exploration using multidimensional visualization", IEEE computer Graphics and Applications, Sep. 1994.*

Ward, M.O., "XmdvTool: integrating multiple methods for visualizing multivariate data", IEEE Conf. on Visualization, Oct. 1994.*

Inselberg et al, "Visualizing multidimensional (multivariate) data and relations", IEEE Conf. on Visualization, Oct. 1994.*

* cited by examiner

*Primary Examiner*—Amelia Au
*Assistant Examiner*—Martin Miller
(74) *Attorney, Agent, or Firm*—Kilpatrick Stockton LLP

(57) ABSTRACT

A scheme for automatic data conversion definition generation based on data feature such as a decision tree or a statistical feature, so as to enable a quick data analysis in a visual multidimensional data analysis tool. In an apparatus for converting data stored in database or files into graphic data according to the data conversion definition and displaying the graphic data, a definition generation assistance device for automatically generating the data conversion definition is provided, where the definition generation assistance device extracts a data feature of the data from a scheme and contents of the database or files, and automatically generates the data conversion definition according to the extracted data feature, the data conversion definition being formed by an attribute mapping definition defining combinations of data attributes and graphic data parameters and a data conversion method definition defining a method for converting a value of each data attribute into a value of a corresponding graphic data parameter.

72 Claims, 24 Drawing Sheets

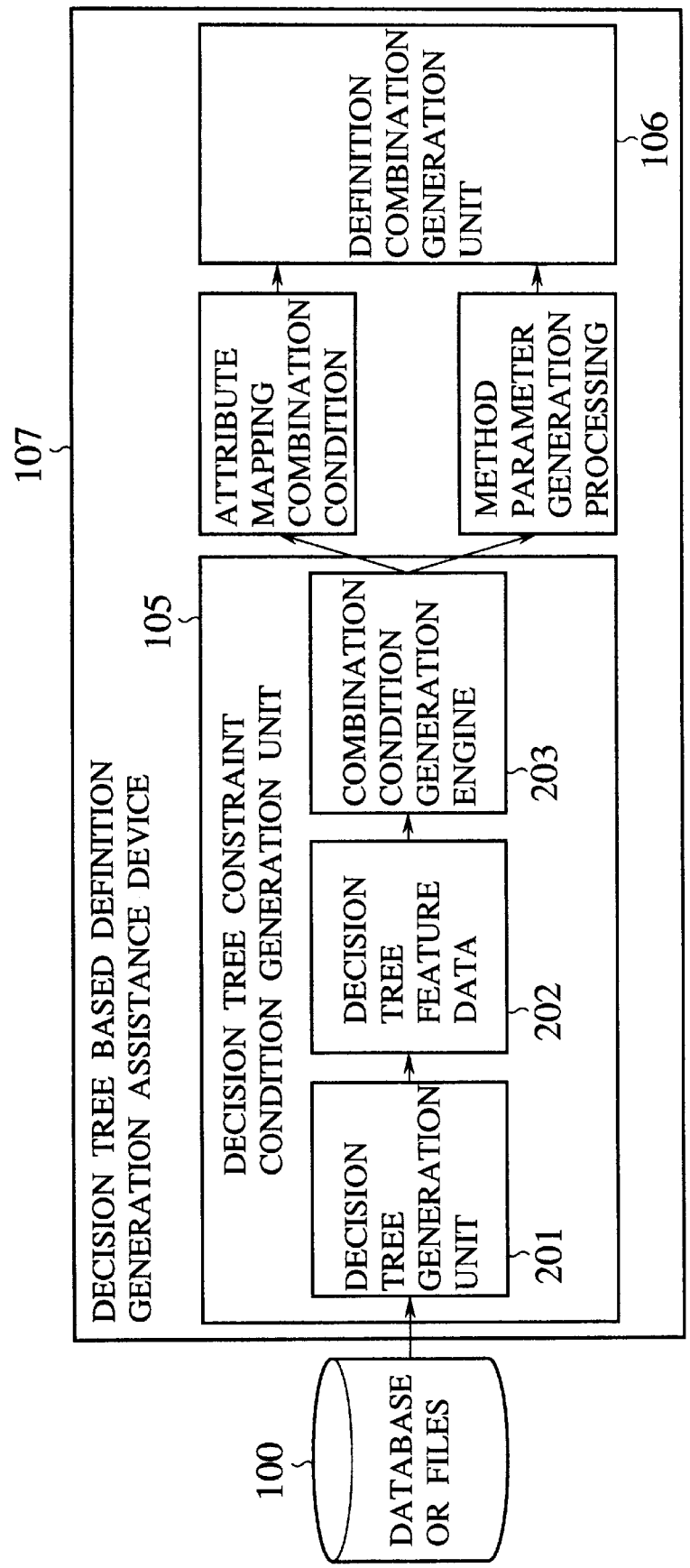

FIG.3

| DATA PRIORITY ORDER ASSIGNMENT RULE | |
|---|---|
| DECISION TREE FEATURE DATA | DATA PRIORITY ORDER ASSIGNMENT RULE |
| DECISION TREE VERTICES | HIGHER PRIORITY FROM UPPER LEVEL VERTICES |
| | HIGHER PRIORITY FROM LOWER LEVEL VERTICES |

FIG.4

| DECISION TREE FEATURE DATA | DATA CONVERSION TARGET DATA | EXPRESSION CONDITION | | |
|---|---|---|---|---|
| | | DATA TYPE | MAPPING | DATA CONVERSION PARAMETER |
| DECISION TREE VERTICES, DISCRIMINATION VALUES | ATTRIBUTES OF VERTICES SELECTED ACCORDING TO PRIORITY ORDERS | QUANTITATIVE DATA | HIGHER PRIORITY IN ORDER OF X-AXIS, Y-AXIS, SIZE, COLOR, LABEL, SHAPE | LOGICAL ARRANGEMENT FOR X-AXIS & Y-AXIS, THRESHOLD SPECIFICATION /UNIFORM DIVISION SPECIFICATION FOR OTHERS |
| | | QUALITATIVE DATA | HIGHER PRIORITY IN ORDER OF X-AXIS, Y-AXIS, COLOR, SIZE, SHAPE, LABEL | LOGICAL ARRANGEMENT FOR X-AXIS & Y-AXIS, CHARACTER STRING SPECIFICATION/ THRESHOLD SPECIFICATION FOR OTHERS |

QUANTITATIVE DATA : DATA WITH VALUE IN CONTINUOUS RANGE
QUALITATIVE DATA : DATA WITH VALUE IN DISCRETE RANGE

FIG.12

| DATA PRIORITY ORDER ASSIGNMENT RULE ||
|---|---|
| STATISTICAL FEATURE DATA | DATA PRIORITY ORDER ASSIGNMENT RULE |
| FACTOR | HIGHER PRIORITY FROM FIRST FACTOR |
| FACTOR LOADING | HIGHER PRIORITY FROM ATTRIBUTES CONTAINED IN FIRST FACTOR |
| CORRELATION COEFFICIENT MATRIX | HIGHER PRIORITY FROM ATTRIBUTE SET WITH HIGHER CORRELATION COEFFICIENTS |
| CLUSTER & CORRELATION COEFFICIENT MATRIX | HIGHER PRIORITY FROM CLUSTERS AND THEN ATTRIBUTE SET WITH HIGHER CORRELATION COEFFICIENTS |
| QUANTIFICATION THEORETICAL VALUES FOR ABOVE | SAME HANDLING AS ABOVE |

FIG. 13

| Statistical Feature Data | Expression Condition | | | |
|---|---|---|---|---|
| | Data Conversion Target Data | Data Type | Mapping | Data Conversion Parameter |
| FACTOR | FACTOR LOADING | QUANTITATIVE DATA | HIGHER PRIORITY IN ORDER OF X-AXIS, Y-AXIS, SIZE, COLOR, LABEL, SHAPE | LOGICAL ARRANGEMENT FOR X-AXIS & Y-AXIS, UNIFORM DIVISION SPECIFICATION / THRESHOLD SPECIFICATION FOR OTHERS |
| | DATA EXTRACTED FROM FACTOR LOADING | | | |
| CORRELATION COEFFICIENT MATRIX | DATA EXTRACTED FROM CORRELATION COEFFICIENT | | | |
| CLUSTER | CLUSTER | QUALITATIVE DATA | HIGHER PRIORITY IN ORDER OF X-AXIS, Y-AXIS, COLOR, SIZE, SHAPE, LABEL | LOGICAL ARRANGEMENT FOR X-AXIS & Y-AXIS, CHARACTER STRING SPECIFICATION / THRESHOLD SPECIFICATION FOR OTHERS |
| QUANTIFICATION THEORETICAL VALUE FOR ABOVE | DATA EXTRACTED FROM QUANTIFICATION THEORETICAL VALUE | | | |

QUANTITATIVE DATA : DATA WITH VALUE IN CONTINUOUS RANGE
QUALITATIVE DATA : DATA WITH VALUE IN DISCRETE RANGE

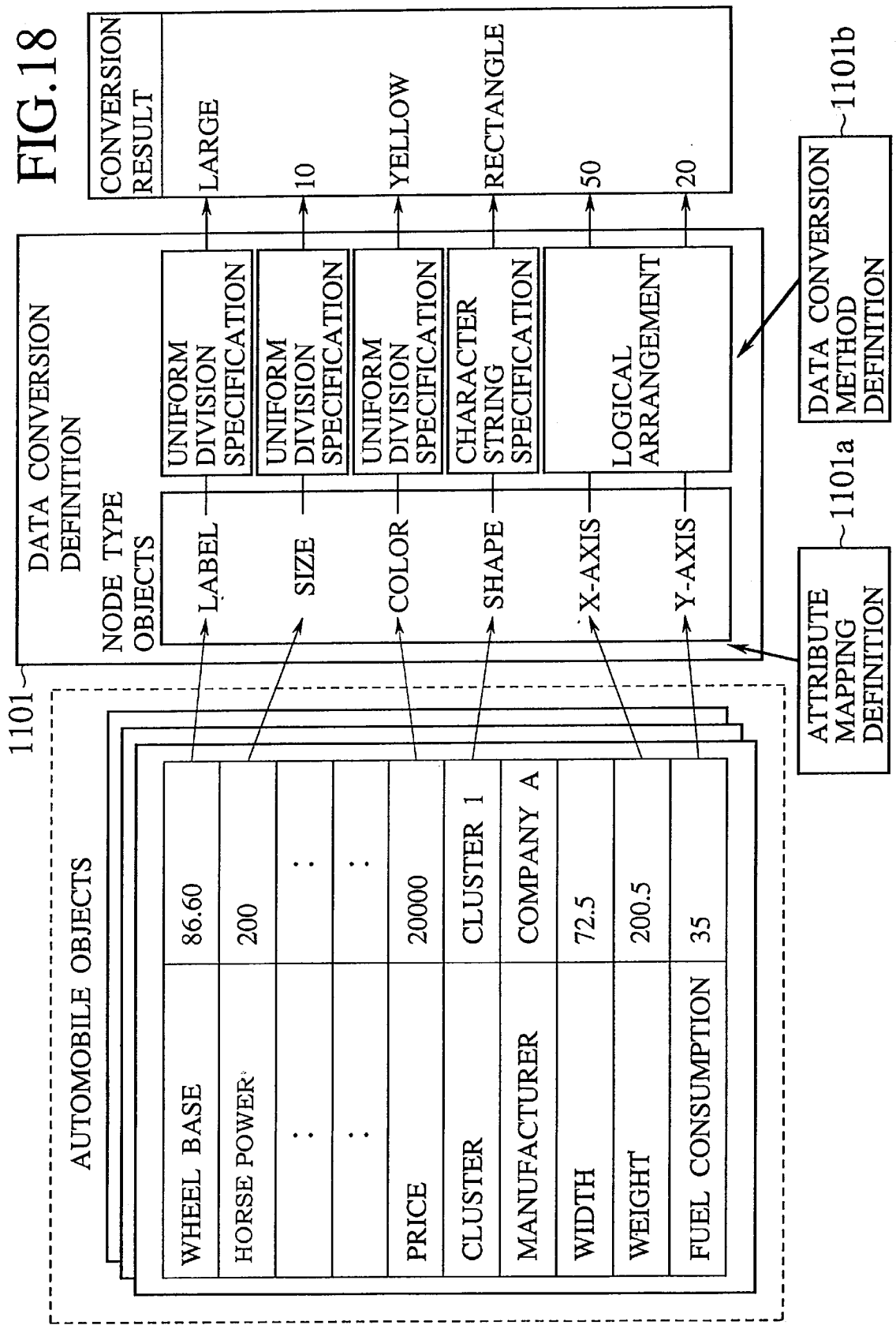

FIG.19

|     | $A_0$ | $A_1$ | $A_2$ | $A_3$ | $A_4$ | $A_5$ | $A_6$ | $A_7$ | ... | $A_n$ |
|-----|-------|-------|-------|-------|-------|-------|-------|-------|-----|-------|
| $A_0$ | $C_{00}$ | $C_{01}$ | $C_{02}$ | $C_{03}$ | $C_{04}$ | $C_{05}$ | $C_{06}$ | $C_{07}$ | ... | $C_{0n}$ |
| $A_1$ | $C_{10}$ | $C_{11}$ | $C_{12}$ | $C_{13}$ | $C_{14}$ | $C_{15}$ | $C_{16}$ | $C_{17}$ | ... | $C_{1n}$ |
| $A_2$ | $C_{20}$ | $C_{21}$ | $C_{22}$ | $C_{23}$ | $C_{24}$ | $C_{25}$ | $C_{26}$ | $C_{27}$ | ... | $C_{2n}$ |
| $A_3$ | $C_{30}$ | $C_{31}$ | $C_{32}$ | $C_{33}$ | $C_{34}$ | $C_{35}$ | $C_{36}$ | $C_{37}$ | ... | $C_{3n}$ |
| $A_4$ | $C_{40}$ | $C_{41}$ | $C_{42}$ | $C_{43}$ | $C_{44}$ | $C_{45}$ | $C_{46}$ | $C_{47}$ | ... | $C_{4n}$ |
| $A_5$ | $C_{50}$ | $C_{51}$ | $C_{52}$ | $C_{53}$ | $C_{54}$ | $C_{55}$ | $C_{56}$ | $C_{57}$ | ... | $C_{5n}$ |
| $A_6$ | $C_{60}$ | $C_{61}$ | $C_{62}$ | $C_{63}$ | $C_{64}$ | $C_{65}$ | $C_{66}$ | $C_{67}$ | ... | $C_{6n}$ |
| $A_7$ | $C_{70}$ | $C_{71}$ | $C_{72}$ | $C_{73}$ | $C_{74}$ | $C_{75}$ | $C_{76}$ | $C_{77}$ | ... | $C_{7n}$ |
| ... | ... | ... | ... | ... | ... | ... | ... | ... | ... | ... |
| $A_n$ | $C_{n0}$ | $C_{n1}$ | $C_{n2}$ | $C_{n3}$ | $C_{n4}$ | $C_{n5}$ | $C_{n6}$ | $C_{n7}$ | ... | $C_{nn}$ |

$C_{ij}$: CORRELATION COEFFICIENT OF ATTRIBUTES $A_i$ & $A_j$

FIG.23

| | ATTRIBUTE $A_1$ | ATTRIBUTE $A_2$ | ATTRIBUTE $A_3$ |
|---|---|---|---|
| RECORD 1 | XXX | aaa | 100 |
| RECORD 2 | YYY | bbb | 200 |
| RECORD 3 | ZZZ | ccc | 300 |
| RECORD 4 | ZZZ | ddd | 500 |
| RECORD 5 | YYY | eee | 150 |
| RECORD 6 | XXX | aaa | 650 |
| RECORD 7 | YYY | ccc | 700 |
| RECORD 8 | YYY | bbb | 405 |

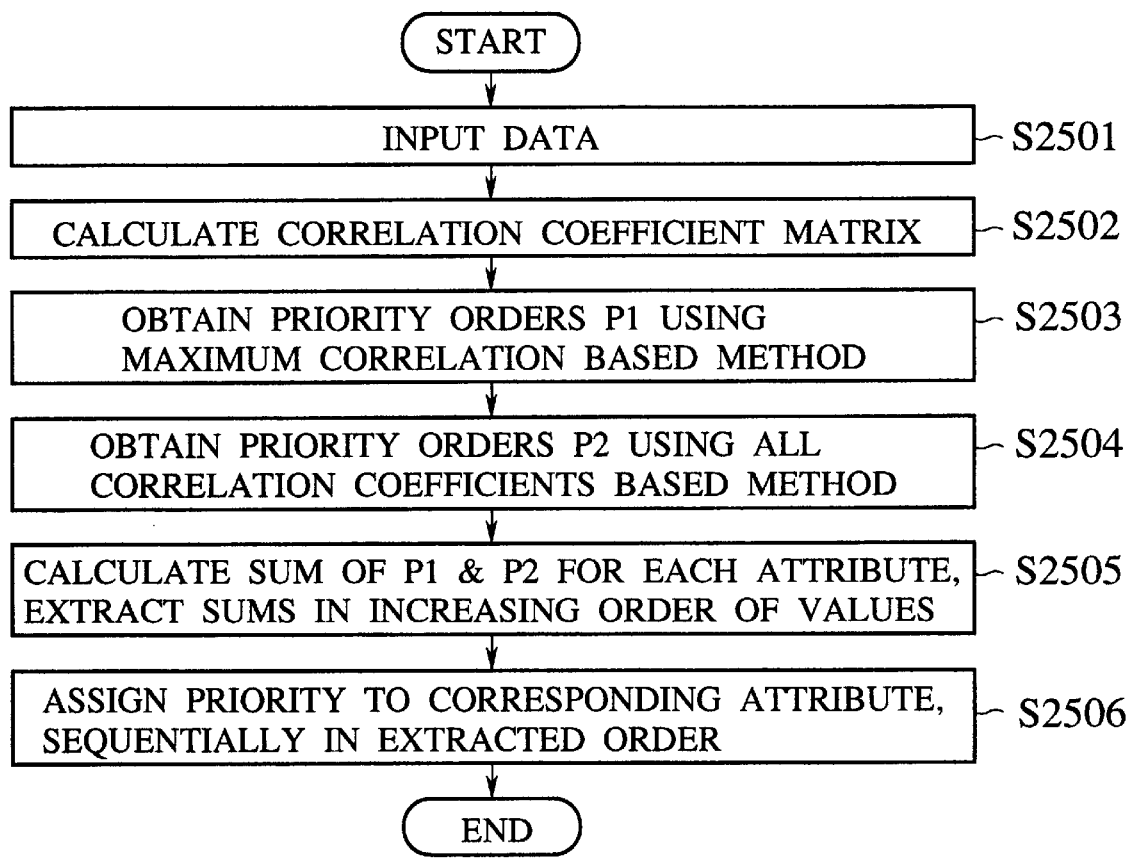

SCHEME FOR AUTOMATIC DATA CONVERSION DEFINITION GENERATION ACCORDING TO DATA FEATURE IN VISUAL MULTIDIMENSIONAL DATA ANALYSIS TOOL

BACKGROUND OF THE INVENTION

1. Field of the Invention

The present invention relates to a scheme for automatically generating graphic expressions according to data feature such as a decision tree for classifying target attributes or a statistical feature of data in a visual multidimensional data analysis tool which is to be used in applying a sophisticated data analysis with respect to data stored in database or files, and more particularly, to a scheme for automatically generating data conversion definition according to the data feature which is to be used in a data conversion display device for converting data stored in database or files into graphic data according to the data conversion definition and displaying converted graphic data.

2. Description of the Background Art

In the conventional visual multidimensional data analysis tool, visualization conditions are usually defined by a user, and there is no known scheme for assisting this definition generation by the user according to a decision tree for classifying target attributes or statistical feature of data.

Thus in the conventional visual multidimensional data analysis tool, visualization conditions have to be defined by the user so that many trials and errors are required at a time of data analysis, and there has been a problem that it has been impossible to carry out the data analysis quickly.

Also, in the conventional visual multidimensional data analysis tool, visualization target attributes are to be selected and obtained by the user by repeating attribute selection operations.

In this regard, in the conventional visual multidimensional data analysis tool, there is no known scheme for automatically selecting target attributes by assigning priority orders among a plurality of attributes according to a correlation coefficient matrix, and it has been necessary for the user to select the visualization target attributes so that the user is required to repeat operations for selecting attributes that are effective for the data analysis and therefore there has been a problem that it has been impossible to carry out the data analysis quickly.

SUMMARY OF THE INVENTION

It is therefore an object of the present invention to provide a scheme for automatic data conversion definition generation based on data feature such as a decision tree or a statistical feature, so as to enable a quick data analysis in a visual multidimensional data analysis tool.

It is another object of the present invention to provide a scheme for automatic data conversion definition generation, which is capable of assigning priority orders among a plurality of attributes according to a correlation coefficient matrix and selecting visualization target attributes from data and a number of attributes to be selected entered by the user at a time of large quantity multidimensional data analysis.

According to one aspect of the present invention there is provided an automatic definition generation device for automatically generating a data conversion definition to be used in an apparatus for converting data stored in database or files into graphic data according to the data conversion definition and displaying the graphic data, the device comprising: a feature extraction unit for extracting a data feature of the data from a scheme and contents of the database or files; and a definition generation unit for automatically generating the data conversion definition according to the data feature extracted by the feature extraction unit, the data conversion definition being formed by an attribute mapping definition defining combinations of data attributes and graphic data parameters and a data conversion method definition defining a method for converting a value of each data attribute into a value of a corresponding graphic data parameter.

According to another aspect of the present invention there is provided an automatic definition generation method for automatically generating a data conversion definition to be used in an apparatus for converting data stored in database or files into graphic data according to the data conversion definition and displaying the graphic data, the method comprising the steps of: extracting a data feature of the data from a scheme and contents of the database or files; and automatically generating the data conversion definition according to the data feature extracted by the extracting step, the data conversion definition being formed by an attribute mapping definition defining combinations of data attributes and graphic data parameters and a data conversion method definition defining a method for converting a value of each data attribute into a value of a corresponding graphic data parameter.

According to another aspect of the present invention there is provided an article of manufacture, comprising: a computer usable medium having computer readable program code means embodied therein for causing a computer to function as an automatic definition generation system for automatically generating a data conversion definition to be used in an apparatus for converting data stored in database or files into graphic data according to the data conversion definition and displaying the graphic data, the computer readable program code means includes: first computer readable program code means for causing said computer to extract a data feature of the data from a scheme and contents of the database or files; and second computer readable program code means for causing said computer to automatically generate the data conversion definition according to the data feature extracted by the first computer readable program code means, the data conversion definition being formed by an attribute mapping definition defining combinations of data attributes and graphic data parameters and a data conversion method definition defining a method for converting a value of each data attribute into a value of a corresponding graphic data parameter.

Other features and advantages of the present invention will become apparent from the following description taken in conjunction with the accompanying drawings.

BRIEF DESCRIPTION OF THE DRAWINGS

FIG. 2 is a block diagram showing an internal configuration of a decision tree constraint condition generation unit in a decision tree based definition generation assistance device in the apparatus of FIG. 1.

FIG. 3 is a table showing a data priority order assignment rule used in a decision tree based definition generation assistance device in the apparatus of FIG. 1.

FIG. 4 is a table showing an expression condition used in a decision tree based definition generation assistance device in the apparatus of FIG. 1.

FIG. 12 is a table showing a data priority order assignment rule used in a statistical feature based definition generation assistance device in the apparatus of FIG. 10.

FIG. 13 is a table showing an expression condition used in a statistical feature based definition generation assistance device in the apparatus of FIG. 10.

FIG. 18 is a diagram showing an outline of a data conversion processing by a statistical feature based definition generation assistance device in the apparatus of FIG. 10.

FIG. 19 is a diagram showing a correlation coefficient matrix used in the third embodiment of the present invention.

FIG. 23 is a diagram showing an exemplary data in a case of obtaining a discrete index used in the third embodiment of the present invention.

FIG. 25 is a flow chart for an attribute priority order assignment method according to the third embodiment of the present invention for a case merging a maximum correlation based case and all correlation coefficients based case.

DETAILED DESCRIPTION OF THE PREFERRED EMBODIMENTS

Referring now to FIG. 1 to FIG. 9, the first embodiment of an automatic data conversion definition generation scheme according to the present invention will be described in detail.

Figure 1:
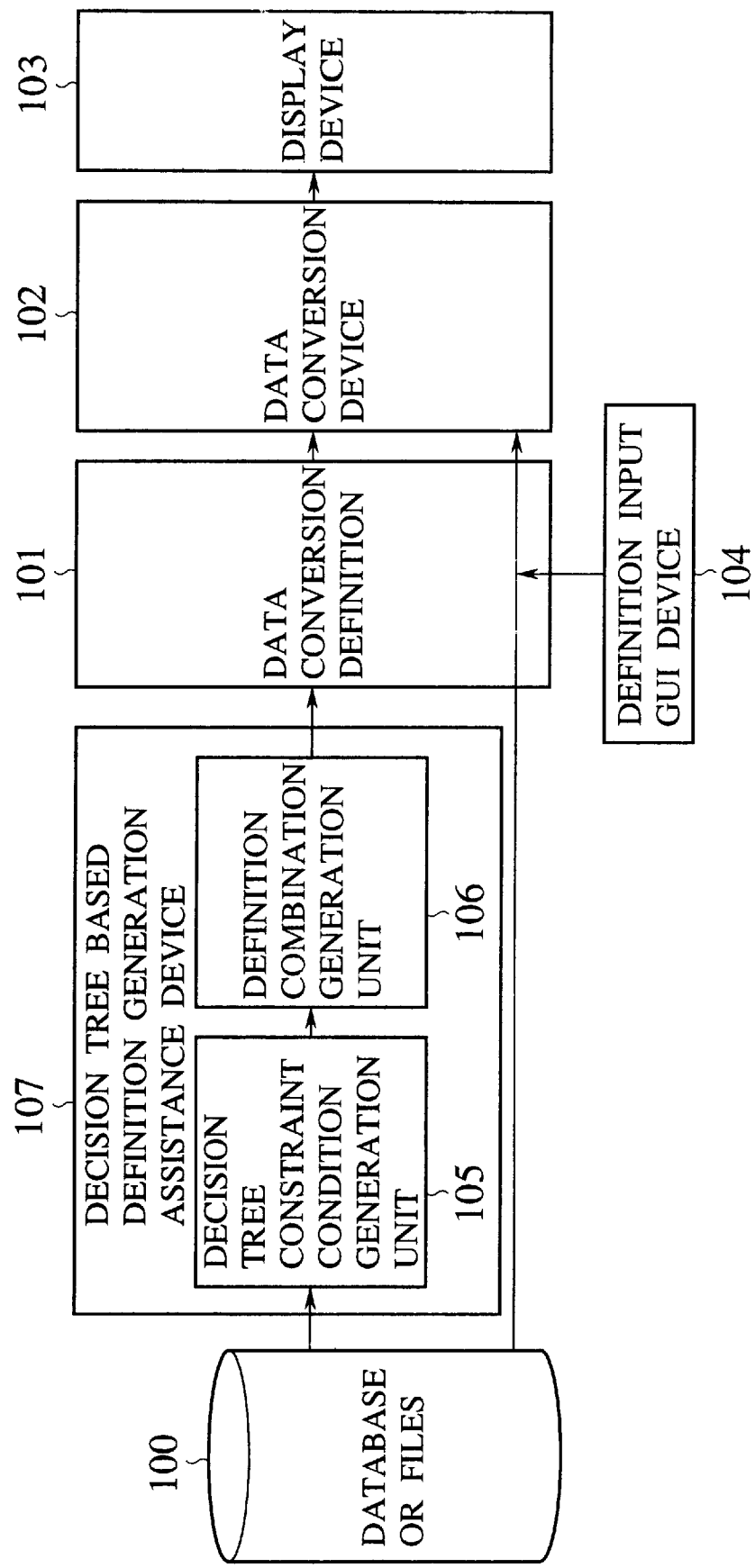
FIG. 1 is a block diagram of a data conversion display apparatus using a decision tree based definition generation assistance device according to the first embodiment of the present invention.

FIG. 1 shows a configuration of a data conversion display apparatus using a decision tree based definition generation assistance device according to this first embodiment. In the data conversion display apparatus of FIG. 1, data stored in a data source such as database or files 100 are converted into graphic data according to a data conversion definition 101 at a data conversion device 102, and the converted graphic data are displayed at a display device 103. The data conversion definition 101 is conventionally to be defined by the user through a definition input GUI (Grapical User Interface) device 104, but in this first embodiment, the data conversion definition 101 is to be generated automatically according to a data feature at a decision tree based definition generation assistance device 107. In addition, it is possible for the user to change the automatically generated data conversion definition 101 through the definition input GUI device 104 in this data conversion display apparatus of FIG. 1. Note that the data conversion definition 101 is an information that defines how data stored in the database or files 100 are to be converted into graphic data by the data conversion device 102.

As shown in FIG. 1, the decision tree based definition generation assistance device 107 comprises a decision tree constraint condition generation unit 105 and a definition combination generation unit 106.

As shown in FIG. 2, the decision tree constraint condition generation unit 105 further comprises a decision tree generation unit 201 that generates a decision tree for classifying target attributes from scheme and contents of the database or files 100, and a combination condition generation engine 203 that generates candidates for a combination condition on attribute mapping from a decision tree feature data 202 of the decision tree generated by the decision tree generation unit 201. Note that the decision tree is a well known tree-like classifier generated by sequentially selecting attributes that are most effective in classifying records, according to values of target attributes which are classification targets entered by a user.

Here, the generation of the combination condition in the combination condition generation engine 203 is carried out according to a data priority order assignment rule shown in FIG. 3, that is, a data priority order assignment rule for assigning priority orders to data conversion target attributes or values according to the decision tree feature data 202.

In this first embodiment, the decision tree feature data is given by vertices of the decision tree, and the data priority order assignment rule assigns higher priority orders from upper level vertices, or from lower level vertices. Note that the combination condition on attribute mapping is an information that indicates an ordered sequence of attributes obtained according to this data priority order assignment rule.

Figure 5:
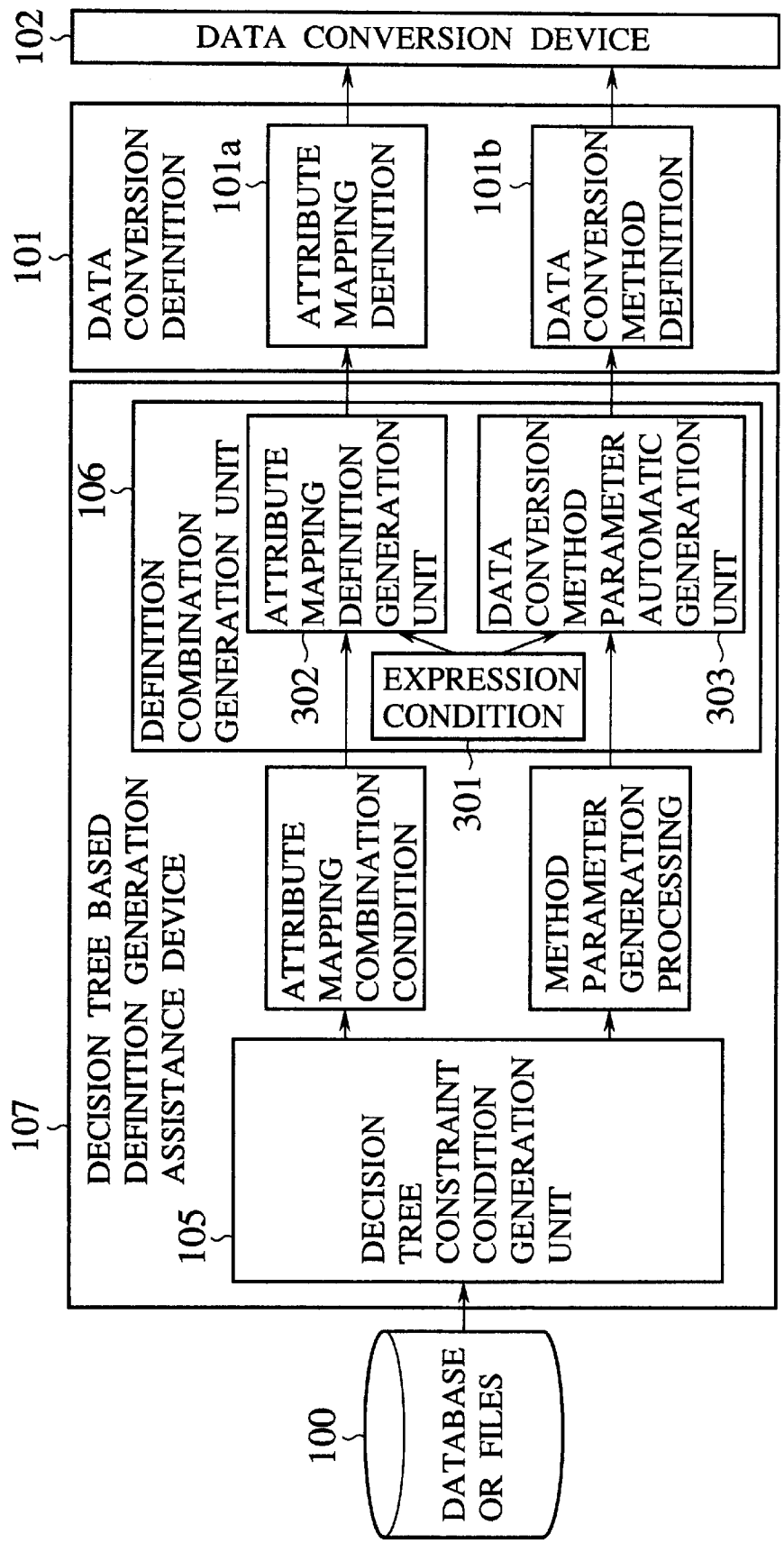
FIG. 5 is a block diagram showing an internal configuration of a definition combination generation unit in a decision tree based definition generation assistance device in the apparatus of FIG. 1.

As shown in FIG. 5, the definition combination generation unit 106 further comprises an attribute mapping definition generation unit 302 for determining attributes to be used in the data conversion by combining the combination condition generated by the decision tree constraint condition generation unit 105 and a pre-registered expression condition 301, and a data conversion method parameter automatic generation unit 303 for determining parameters corresponding to data conversion methods.

The expression condition 301 is given as shown in FIG. 4, and an attribute mapping definition 101a and a data conversion method definition 101b that constitute the data conversion definition 101 are generated at the attribute mapping definition generation unit 302 and the data conversion method parameter automatic generation unit 303, respectively, by combining the combination condition generated according to the data priority order assignment rule in view of the decision tree feature data including the decision tree vertices and discrimination values used in classifying records at the decision tree vertices as well as the expression condition determined according to a data type of each data conversion target data. Here, the attribute mapping definition 101a is an information that defines which attribute is to be set in correspondence (which attribute is to be mapped) to which graphic data parameter, and the data conversion method definition 101b is an information that defines a method by which a value of each attribute is to be converted into a value of the mapped graphic data parameter.

Figure 6:
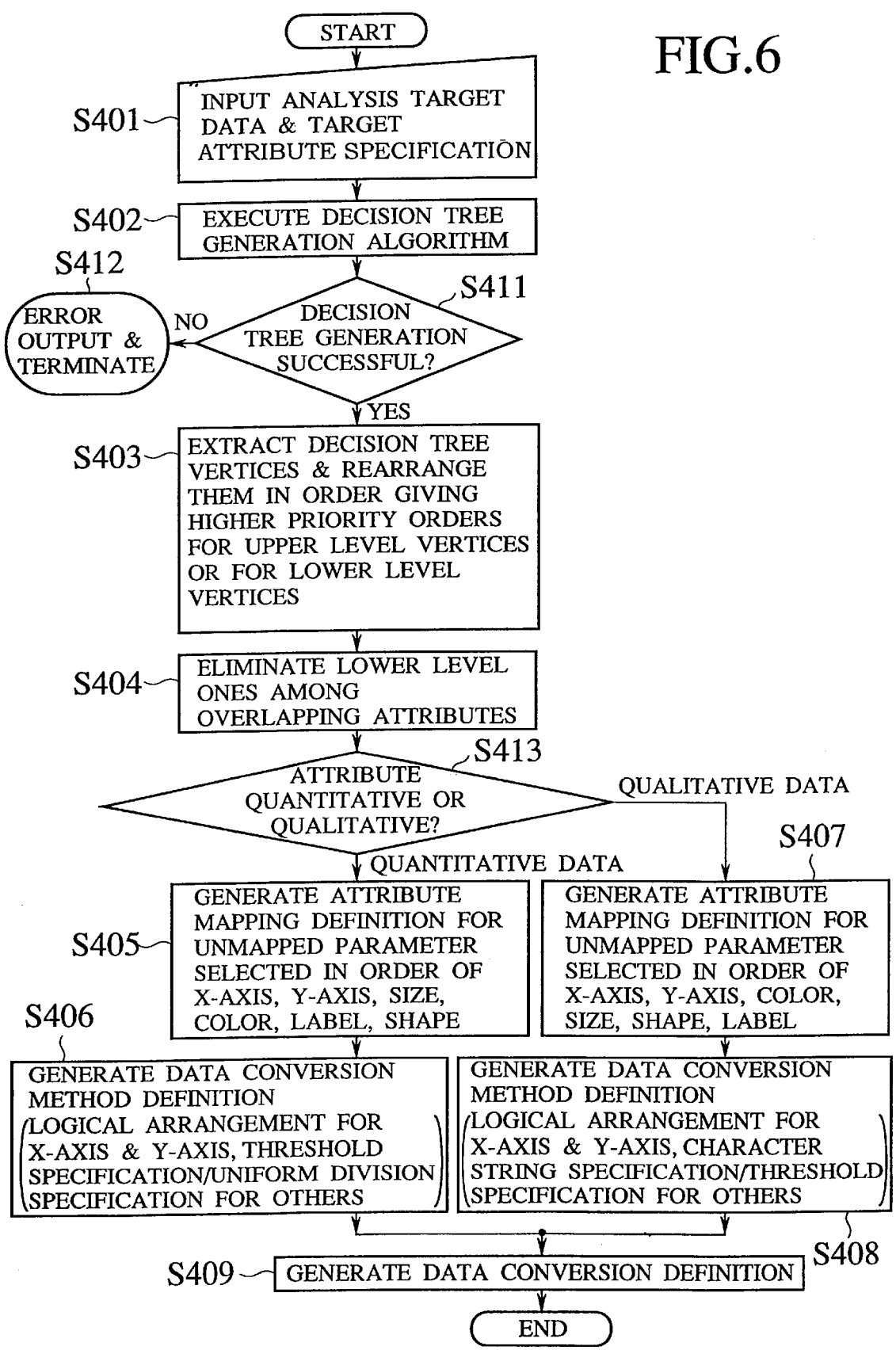
FIG. 6 is a flow chart for a data conversion definition generation processing by a decision tree based definition generation assistance device in the apparatus of FIG. 1.

Now, the data conversion definition generation processing by the decision tree based definition generation assistance device 107 of this first embodiment is carried out according to the flow chart of FIG. 6 as follows.

First, analysis target data and target attribute specification is entered (step S401), and data specified by this input is processed by a decision tree generation algorithm (step S402).

Then, whether the generation of a decision tree was successful or not is checked (step S411). When the generation of a decision tree was unsuccessful, an error output is made and the processing is terminated (step S412), whereas when the generation of a decision tree was successful, vertices of the decision tree are extracted and rearranged in an order giving higher priority orders for upper level vertices or in an order giving higher priority orders for lower level vertices (step S403). Then, in a case where the obtained ordered sequence of attributes has the same attribute appearing more than once, lower level ones among overlapping attributes are eliminated (step S404).

Next, the data type of each data conversion target attribute is Judged to be quantitative or qualitative, sequentially in an order of priority orders among attributes (step S413). Here, the quantitative data is data which has a value in a continuous range, and the qualitative data is data which has a value in a discrete range.

When the data conversion target attribute is the quantitative data, the attribute mapping definition for this data conversion target attribute is generated for a still unmapped graphic data parameter which is selected in an order of X-axis, Y-axis, size, color, label and shape according to the expression condition for the quantitative data as shown in FIG. 4 (step S405), and the data conversion method definition is generated by means of logical arrangements for X-axis and Y-axis and a threshold specification or a uniform division specification for the others (step S406).

On the other hand, when the data conversion target attribute is the qualitative data, the attribute mapping definition for this data conversion target attribute is generated for a still unmapped graphic data parameter which is selected in an order of X-axis, Y-axis, color, size, shape and label according to the expression condition for the qualitative data as shown in FIG. 4 (step S407), and the data conversion method definition is generated by means of logical arrangements for X-axis and Y-axis and a character string specification or a threshold specification for the others (step S408).

Finally, the attribute mapping definition and the data conversion method definition generated at the steps S405 and S406 or the steps S407 and S408 are combined so as to generate the data conversion definition 101 (step S409).

Note that the logical arrangement (relative projection arrangement) is a method for arranging figures according to data attribute values in which figures with minimum and maximum values for data attributes mapped to X-axis and Y-axis are arranged at edges of a screen and each figure is arranged at X-axis and Y-axis values that are proportional to corresponding data attribute values.

Also, the threshold specification is a method for converting data attribute values into graphic data parameter values in which data attribute values are divided at arbitrary data attribute value used as a threshold and divided data attribute values are converted into different graphic data parameter values. This threshold specification can be defined for both quantitative data and qualitative data but may not be defined for some qualitative data such as those given by character strings. In this embodiment, the discrimination value at a corresponding decision tree vertex is to be used as threshold in a case of the threshold specification.

Also, the uniform division specification is a method for converting data attribute values into graphic data parameter values in which a range of data attribute values from a maximum value to a minimum value is divided into a prescribed division number of equal sections and data attribute values of different sections are converted into different graphic data parameter values. This uniform division specification is defined for the quantitative data.

Also, the character string specification is a method for converting data attribute values into graphic data parameter values in which each data attribute value is converted into a one-to-one corresponding graphic data parameter value. This character string specification is defined for the qualitative data.

Figure 7:
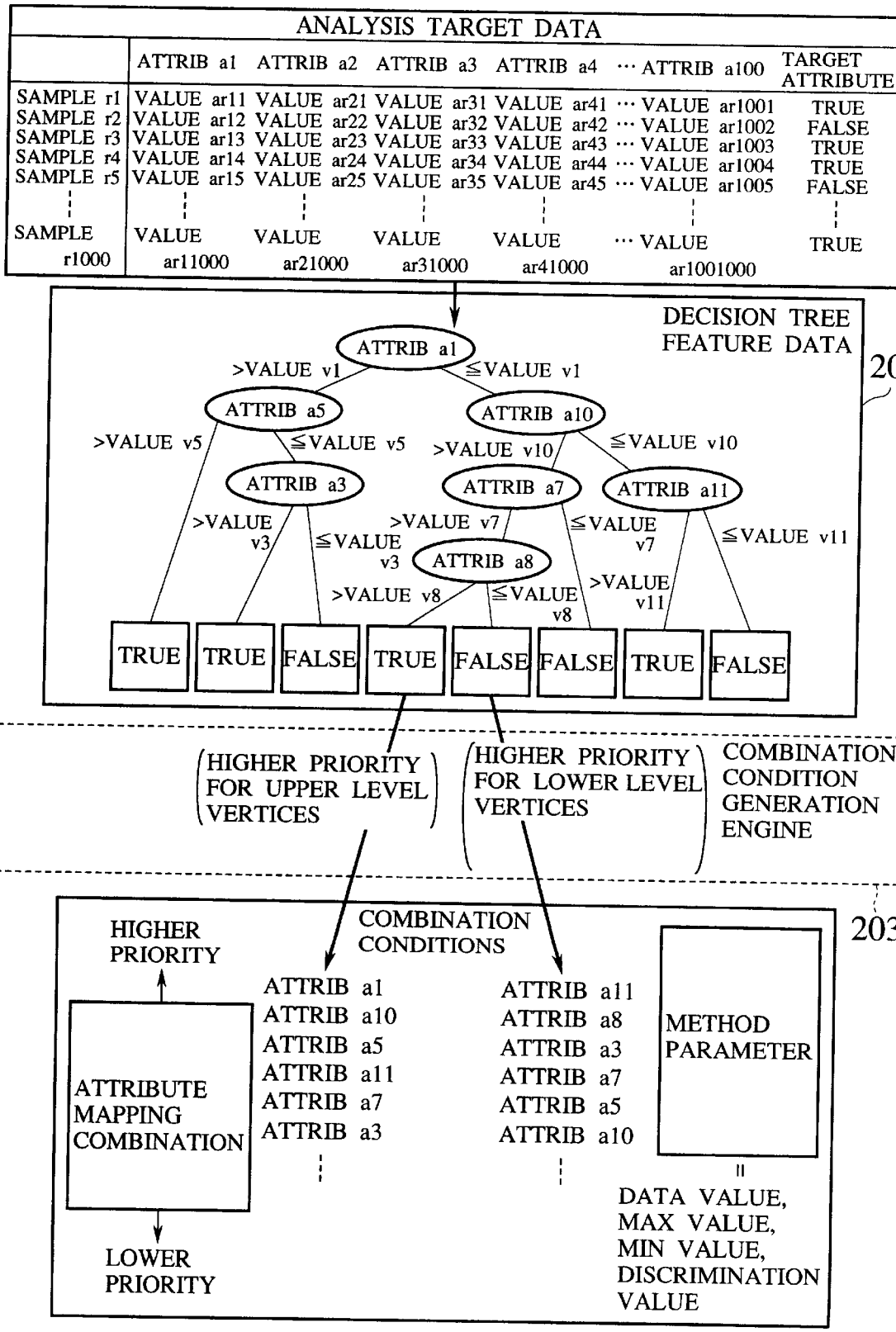
FIG. 7 is a diagram showing an exemplary processing by a decision tree constraint condition generation unit in a decision tree based definition generation assistance device in the apparatus of FIG. 1.

FIG. 7 shows an exemplary processing by the decision tree constraint condition generation unit 105. In this example, the analysis target data are subjected to the decision tree generation processing by the decision tree generation unit 201 to yield the decision tree feature data 202, and the combination conditions are generated by the combination condition generation engine 203 using the data priority order assignment rule shown in FIG. 3, according to this decision tree feature data 202. In this case, method parameters to be used at the data conversion method parameter automatic generation unit 303 in the definition combination generation 106 at the next stage are set to be data value, maximum value, minimum value and discrimination value.

Figure 8:
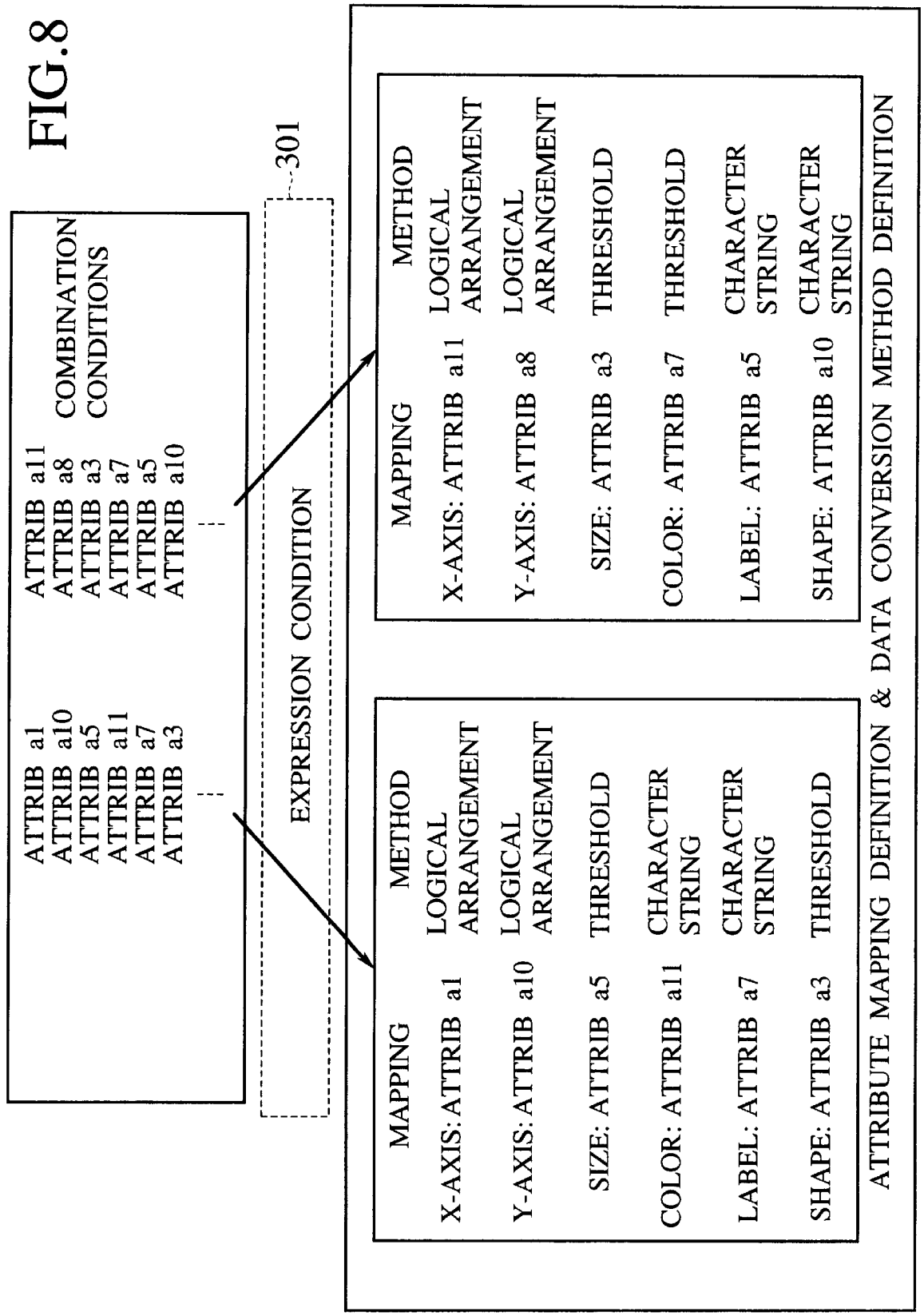
FIG. 8 is a diagram showing an exemplary processing by a definition combination generation unit in a decision tree based definition generation assistance device in the apparatus of FIG. 1.

FIG. 8 shows an exemplary processing by the definition combination generation unit 106. In this example, the the attribute mapping definition and the data conversion method definition are generated by combining each combination condition and the expression condition 301 of FIG. 4 determined by the data type of the data conversion target data which is selected according to each combination condition.

Figure 9:
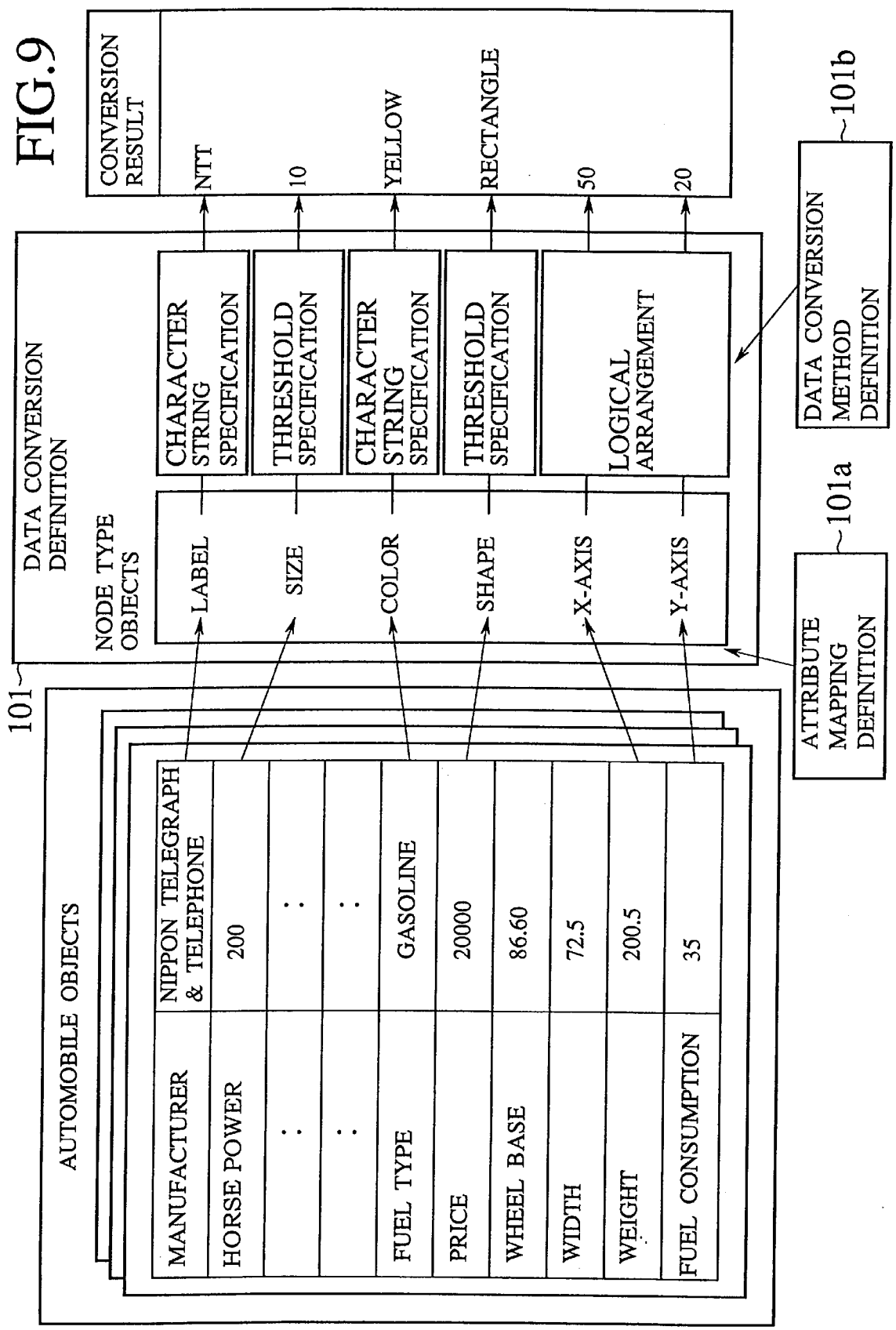
FIG. 9 is a diagram showing an outline of a data conversion processing by a decision tree based definition generation assistance device in the apparatus of FIG. 1.

FIG. 9 shows an outline of the data conversion processing for converting data of the data source such as database or files 100 into graphic data according to the data conversion definition 101 generated by the decision tree based definition generation assistance device 107 of this first embodiment.

As shown in FIG. 9, in the data conversion definition 101, the attribute mapping definition 101a specifies attributes corresponding to label, size, color, shape, X-axis and Y-axis of the graphic object (node type object), while the data conversion method definition 101b specifies a conversion method for each attribute specified by the attribute mapping definition 101a.

Referring now to FIG. 10 to FIG. 18, the second embodiment of an automatic data conversion definition generation scheme according to the present invention will be described in detail.

Figure 10:
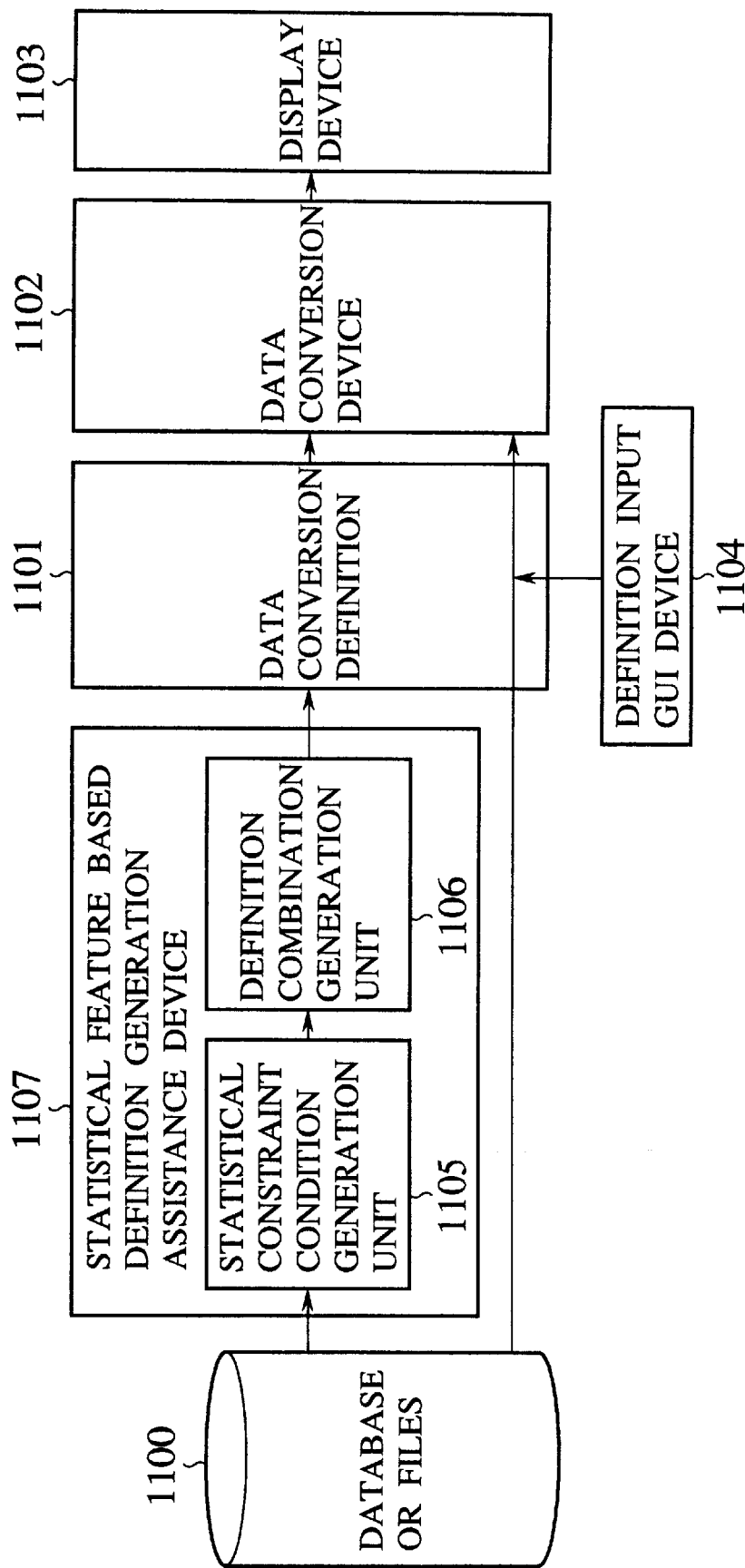
FIG. 10 is a block diagram of a data conversion display apparatus using a statistical feature based definition generation assistance device according to the second embodiment of the present invention.

FIG. 10 shows a configuration of a data conversion display apparatus using a statistical feature based definition generation assistance device according to this second embodiment. In the data conversion display apparatus of FIG. 10, data stored in a data source such as database or files 1100 are converted into graphic data according to a data conversion definition 1101 at a data conversion device 1102, and the converted graphic data are displayed at a display device 1103. The data conversion definition 1101 is conventionally to be defined by the user through a definition input GUI (Grapical User Interface) device 1104, but in this second embodiment, the data conversion definition 1101 is to be generated automatically according to a statistical feature of data at a statistical feature based definition generation assistance device 1107. In addition, it is possible for the user to change the automatically generated data conversion definition 1101 through the definition input GUI device 1104 in this data conversion display apparatus of FIG. 10. Here, the meaning of the data conversion definition is the same as in the first embodiment described above.

As shown in FIG. 10, the statistical feature based definition generation assistance device 1107 comprises a statistical constraint condition generation unit 1105 and a definition combination generation unit 1106.

Figure 11:
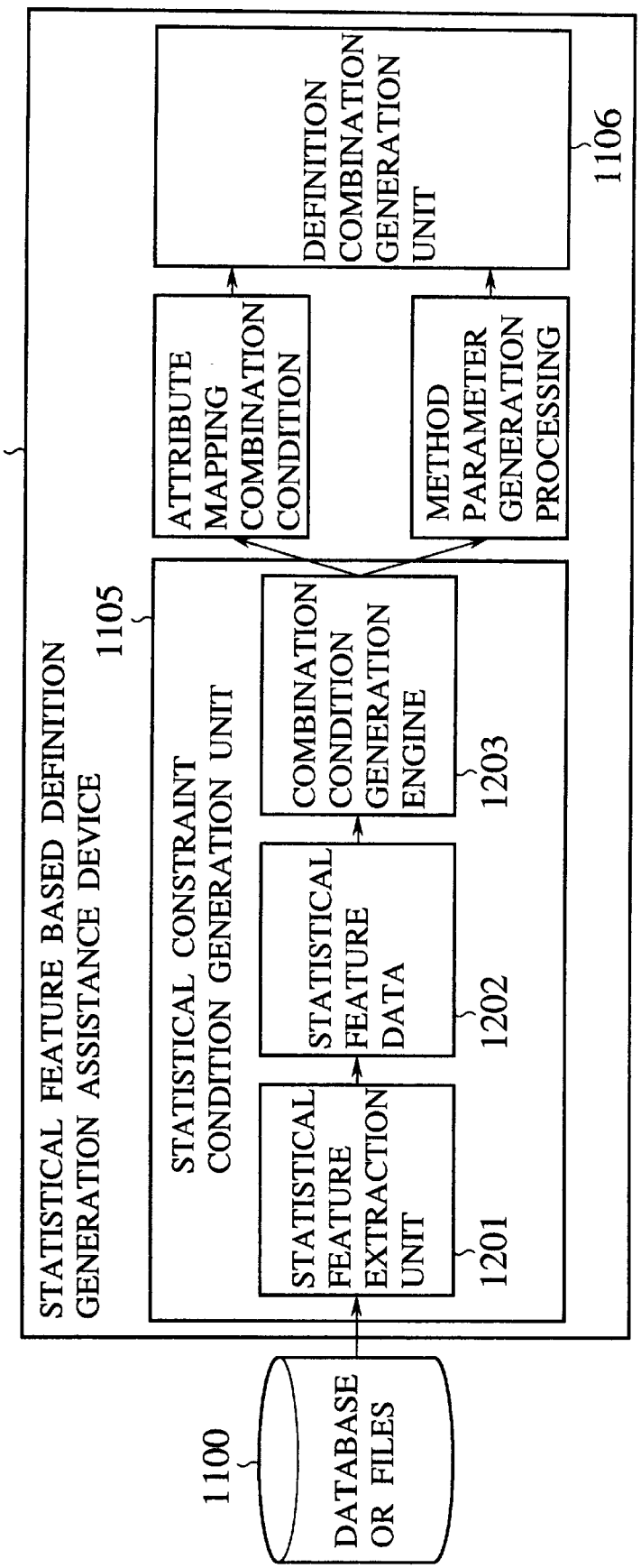
FIG. 11 is a block diagram showing an internal configuration of a statistical constraint condition generation unit in a statistical feature based definition generation assistance device in the apparatus of FIG. 10.

As shown in FIG. 11, the statistical constraint condition generation unit 1105 further comprises a statistical feature extraction unit 1201 that extracts a statistical feature of data from scheme and contents of the database or files 1100, and a combination condition generation engine 1203 that generates candidates for a combination condition on attribute mapping from a statistical feature data 1202 generated by the statistical feature extraction unit 1201.

Here, the generation of the combination condition in the combination condition generation engine 1203 is carried out according to a data priority order assignment rule shown in FIG. 12, that is, a data priority order assignment rule for assigning priority orders to data conversion target attributes or values according to the statistical feature data 1202.

In this second embodiment, the statistical feature data is given by any of a factor, a factor loading, a correlation coefficient (matrix), a cluster and a correlation coefficient (matrix), or their corresponding quantification theory results. Also, the data priority order assignment rule assigns a higher priority order from the first factor when the statistical feature is a factor or its corresponding quantification theory result, assigns higher priority orders from attributes contained in the first factor when the statistical feature is a factor loading or its corresponding quantification theory result, assigns higher priority orders from a set of attributes with a higher correlation coefficient when the statistical feature is a correlation coefficient or its corresponding quantification theory result, or assigns higher priority orders from clusters and then a set of attributes with a higher correlation coefficient when the statistical feature is a cluster and correlation coefficient or their corresponding quantification theory results. Note that the combination condition on attribute mapping is an information that indicates an ordered sequence of factors, attributes and clusters obtained according to this data priority order assignment rule. Note also that factor, factor loading, correlation coefficient, cluster and quantification theory are the well known concepts in the multivariate analysis.

Figure 14:
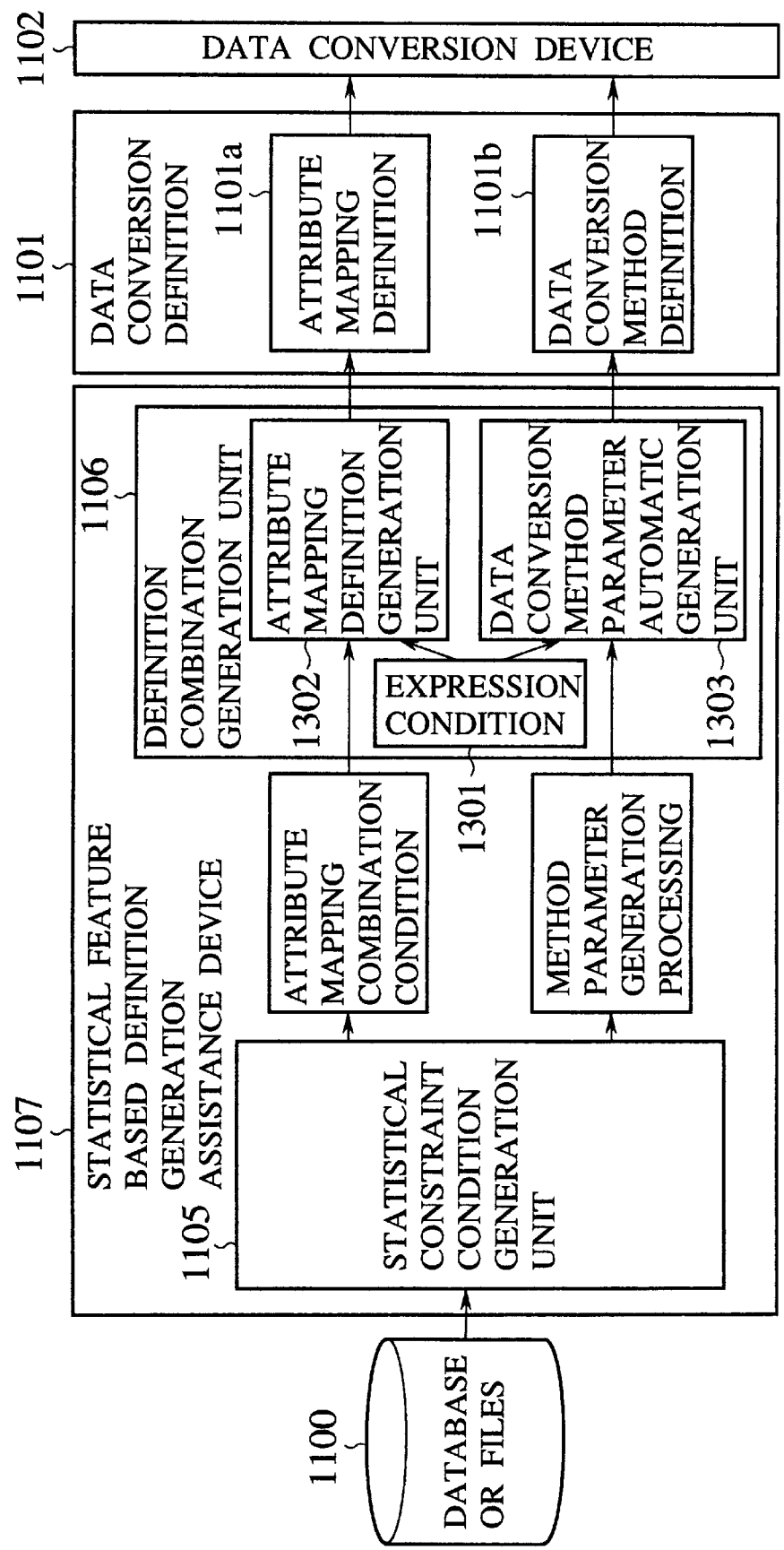
FIG. 14 is a block diagram showing an internal configuration of a definition combination generation unit in a statistical feature based definition generation assistance device in the apparatus of FIG. 10.

As shown in FIG. 14, the definition combination generation unit 1106 further comprises an attribute mapping definition generation unit 1302 for determining attributes to be used in the data conversion by combining the combination condition generated by the statistical constraint condition generation unit 1105 and a pre-registered expression condition 1301, and a data conversion method parameter automatic generation unit 1303 for determining parameters corresponding to data conversion methods.

The expression condition 1301 is given as shown in FIG. 13, and an attribute mapping definition 1101a and a data conversion method definition 1101b that constitute the data conversion definition 1101 are generated at the attribute mapping definition generation unit 1302 and the data conversion method parameter automatic generation unit 1303, respectively, by combining the combination condition generated according to the data priority order assignment rule in view of the statistical feature data and the expression condition determined according to a data type of each data conversion target data. Here, the meanings of the attribute mapping definition 1101a and the data conversion method definition 1101b are the same as in the first embodiment described above.

Figure 15:
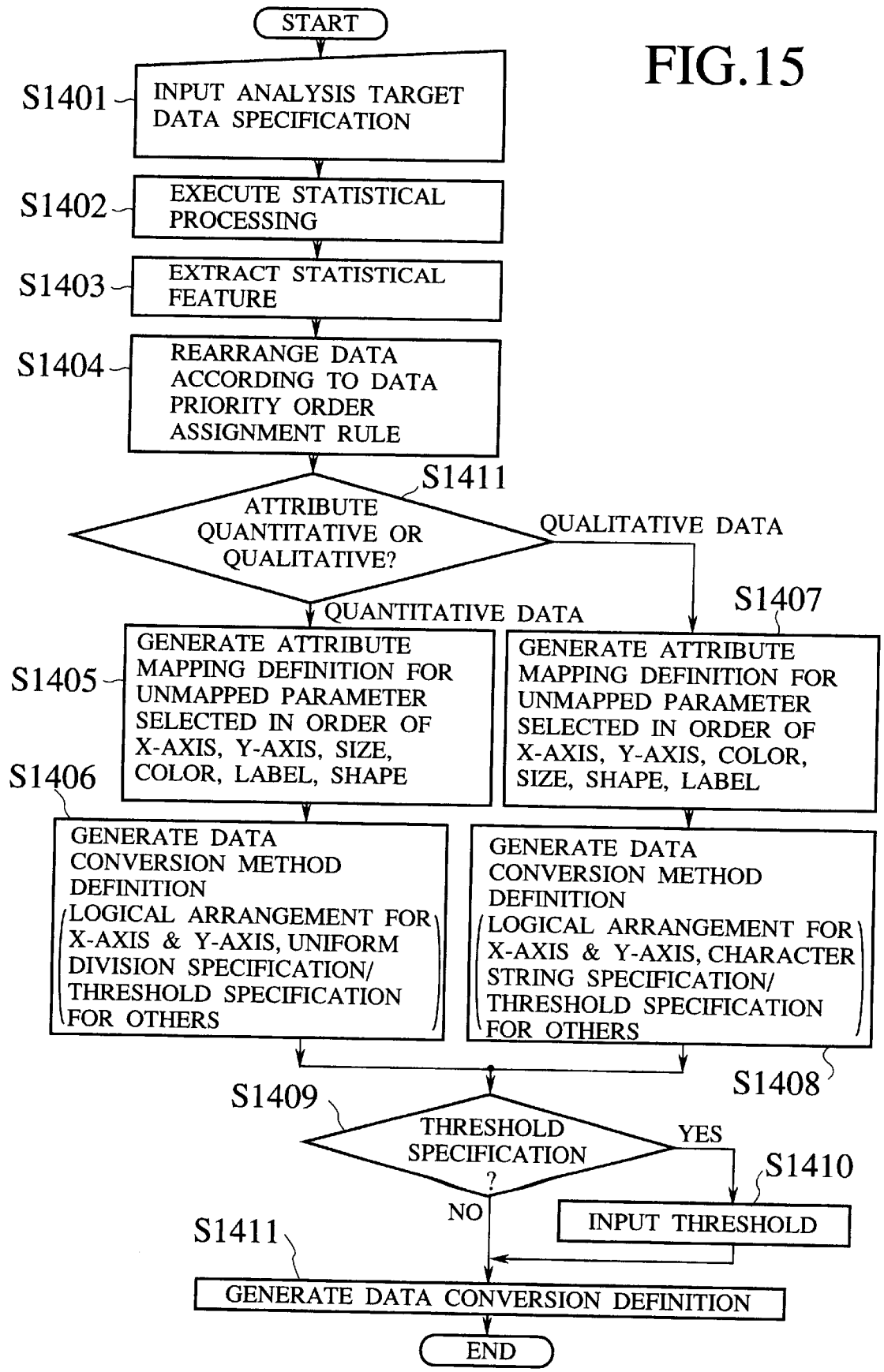
FIG. 15 is a flow chart for a data conversion definition generation processing by a statistical feature based definition generation assistance device in the apparatus of FIG. 10.

Now, the data conversion definition generation processing by the statistical feature based definition generation assistance device 1107 of this second embodiment is carried out according to the flow chart of FIG. 15 as follows.

First, analysis target data specification is entered (step S1401), and data specified by this input is processed by a statistical processing (step S1402).

Then, the statistical feature is extracted (step S1403), and data are rearranged according to the data priority order assignment rule (step S1404).

Next, the data type of each data conversion target attribute is judged to be quantitative or qualitative, sequentially in an order of priority orders among attributes (step S1411). Here, the meanings of the quantitative data and the qualitative data are the same as in the first embodiment described above.

When the data conversion target attribute is the quantitative data, the attribute mapping definition for this data conversion target attribute is generated for a still unmapped graphic data parameter which is selected in an order of X-axis, Y-axis, size, color, label and shape according to the expression condition for the quantitative data as shown in FIG. 13 (step S1405), and the data conversion method definition is generated by means of logical arrangements for X-axis and Y-axis and a uniform division specification or a threshold specification for the others (step S1406).

On the other hand, when the data conversion target attribute is the qualitative data, the attribute mapping definition for this data conversion target attribute is generated for a still unmapped graphic data parameter which is selected in an order of X-axis, Y-axis, color, size, shape and label according to the expression condition for the qualitative data as shown in FIG. 13 (step S1407), and the data conversion method definition is generated by means of logical arrangements for X-axis and Y-axis and a character string specification or a threshold specification for the others (step S1408).

Then, whether it is a threshold specification or not is judged (step S1409), and when it is a threshold specification, a threshold is entered by a user (step S1410).

Finally, the attribute mapping definition and the data conversion method definition generated at the steps S1405 and S1406 or the steps S1407 and S1408 are combined so as to generate the data conversion definition 1101 (step S1411).

Here, the meanings of the logical arrangement, the threshold specification, the uniform division specification, and the character string specification are the same as in the first embodiment described above.

Figure 16:
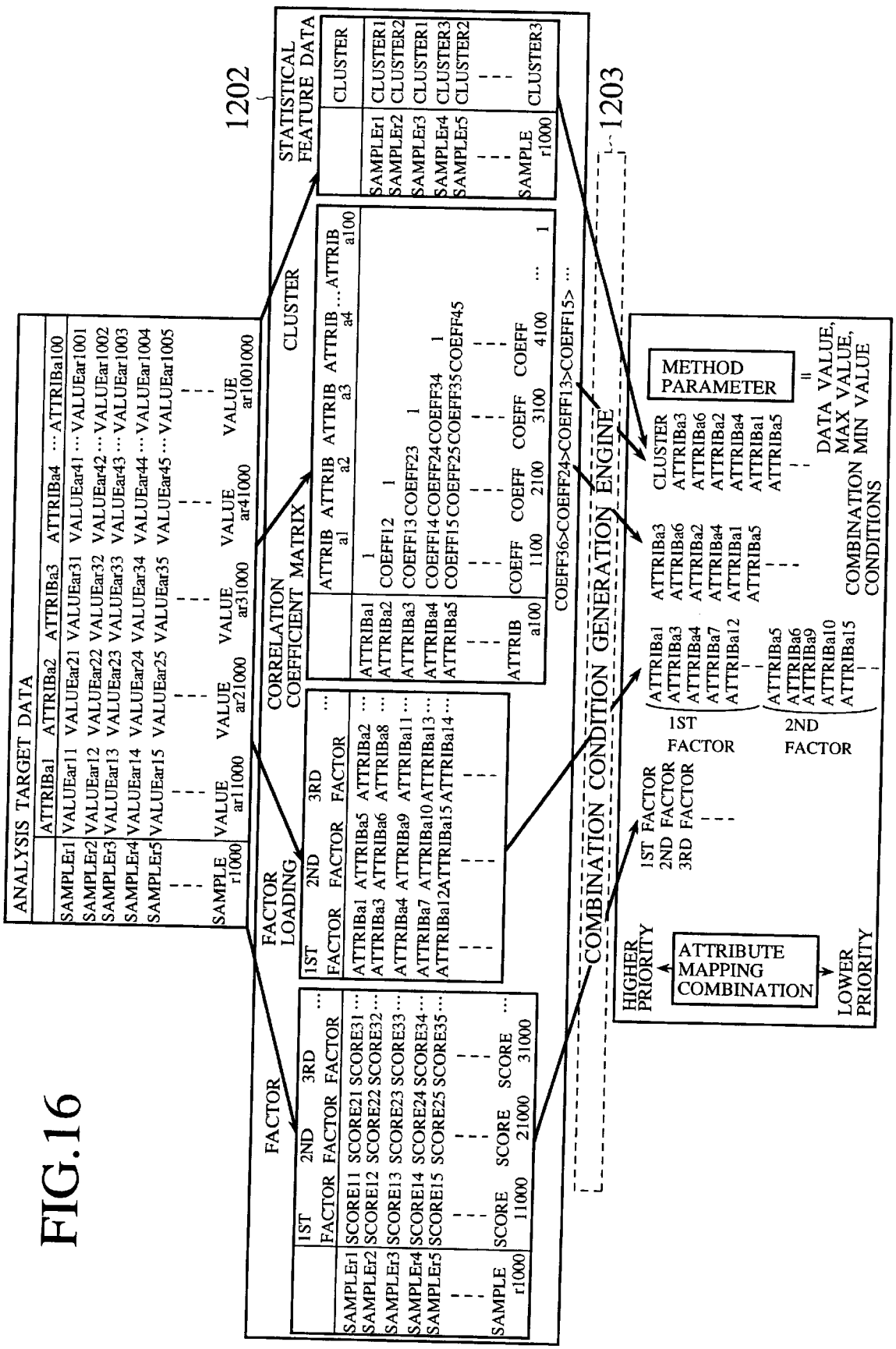
FIG. 16 is a diagram showing an exemplary processing by a statistical constraint condition generation unit in a statistical feature based definition generation assistance device in the apparatus of FIG. 10.

FIG. 16 shows an exemplary processing by the statistical constraint condition generation unit 1105. In this example, the analysis target data are subjected to the statistical processing by the statistical feature extraction unit 1201 to yield the statistical feature data 1202, and the combination conditions are generated by the combination condition generation engine 1203 using the data priority order assignment rule shown in FIG. 12, according to this statistical feature data 1202. In this case, method parameters to be used at the data conversion method parameter automatic generation unit 303 in the definition combination generation 106 at the next stage are set to be data value, maximum value, and minimum value. Note that, in FIG. 16, "score21" for example indicates a factor score for the second factor and the first sample r1, and "coeff36" for example indicates a correlation coefficient between the attributes a3 and a6.

Figure 17:
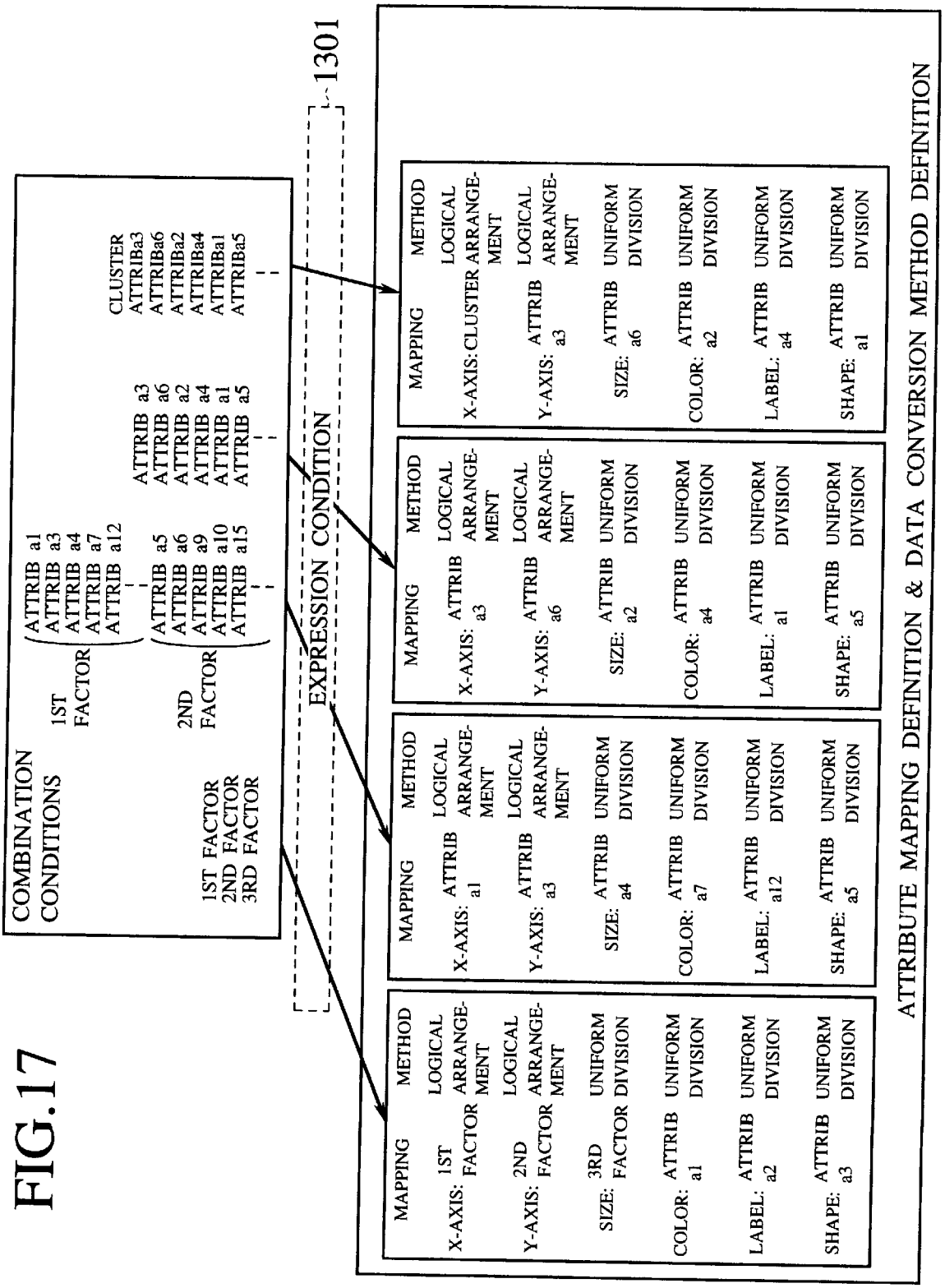
FIG. 17 is a diagram showing an exemplary processing by a definition combination generation unit in a statistical feature based definition generation assistance device in the apparatus of FIG. 10.

FIG. 17 shows an exemplary processing by the definition combination generation unit 1106. In this example, the the attribute mapping definition and the data conversion method definition are generated by combining each combination condition and the expression condition 1301 of FIG. 13 determined by the data type of the data conversion target data which is selected according to each combination condition.

FIG. 18 shows an outline of the data conversion processing for converting data of the data source such as database or files 1100 into graphic data according to the data conversion definition 1101 generated by the statistical feature based definition generation assistance device 1107 of this second embodiment.

As shown in FIG. 18, in the data conversion definition 1101, the attribute mapping definition 1101a specifies attributes corresponding to label, size, color, shape, X-axis and Y-axis of the graphic object (node type object), while the data conversion method definition 1101b specifies a conversion method for each attribute specified by the attribute mapping definition 1101a.

Referring now to FIG. 19 to FIG. 25, the third embodiment of an automatic data conversion definition generation scheme according to the present invention will be described in detail. This third embodiment is directed to a case of using the correlation coefficient (matrix) as the statistical feature in the second embodiment described above, and shows other examples of priority order assignment method for data conversion target attributes based on the correlation coefficient.

FIG. 19 shows a correlation coefficient matrix used in this third embodiment. In FIG. 19, $A_0, A_1, \ldots, A_n$ denote attributes, and $C_{00}, \ldots, C_{nn}$ denote correlation coefficients among attributes, where $C_{ij}$ is a correlation coefficient between attributes $A_i$ and $A_j$.

In the following description of this third embodiment, the attribute priority order assignment method will be described for various cases including a case using a maximum correlation, a case using all correlation coefficients comprehensively, a case using limited correlation coefficients, a case using a discrete index, and a case merging a maximum correlation based case and all correlation coefficients based case.

Now, the first case of assigning priority orders to a plurality of attributes according to a largest correlation coefficient and correlation coefficients of a set of attributes having the largest correlation coefficient with respect to the other attributes in the correlation coefficient matrix among attributes will be described.

Figure 20:
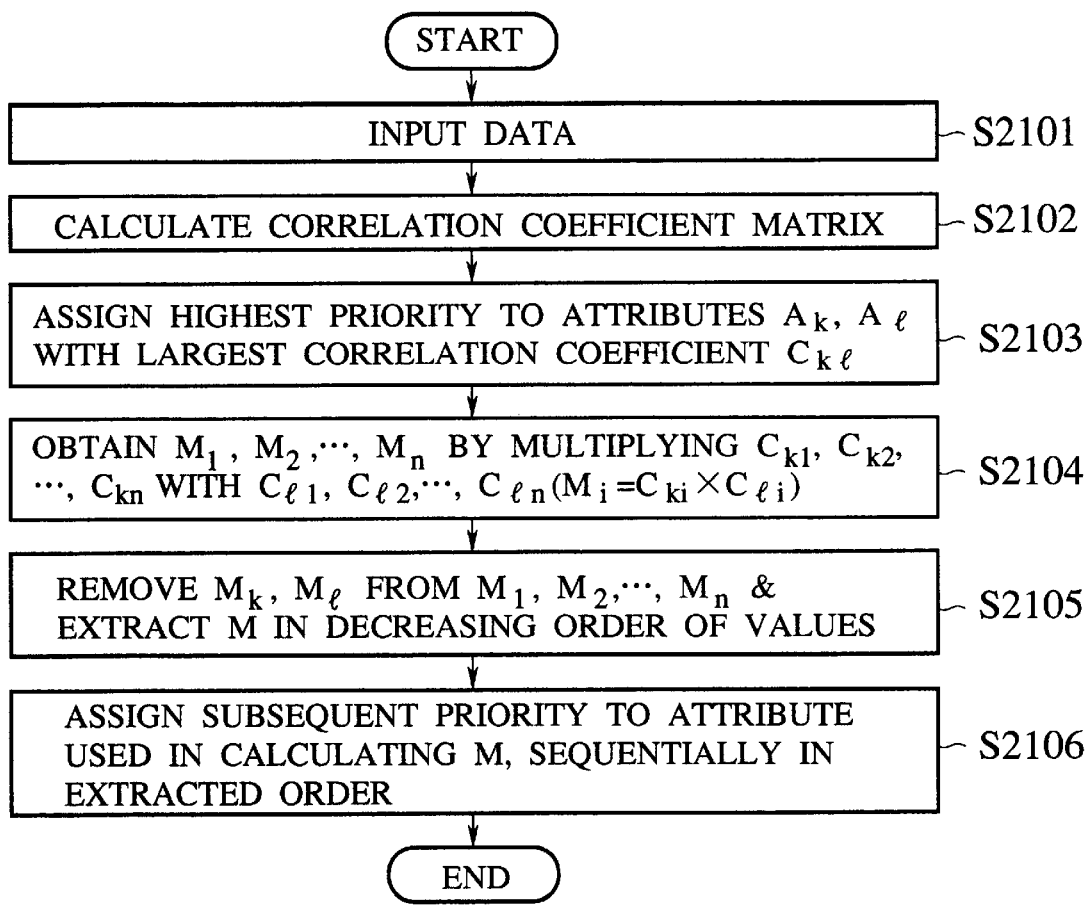
FIG. 20 is a flow chart for an attribute priority order assignment method according to the third embodiment of the present invention for a case using a maximum correlation.

FIG. 20 shows a flow chart for the attribute priority order assignment method using a maximum correlation in this third embodiment, which proceeds as follows.

Step S2101: First, data are entered.

Step S2102: The correlation coefficient matrix is calculated.

Step S2103: The highest priority order is assigned to a set of attributes $A_k$ and $A_l$ which has the largest correlation coefficient $C_{kl}$.

Step S2104: The correlation coefficients $C_{k1}, C_{k2}, \ldots, C_{kl}, \ldots, C_{kn}$ of the attribute $A_k$ with respect to the other attributes are multiplied with corresponding ones of the correlation coefficients $C_{l1}, C_{l2}, \ldots, C_{lk}, \ldots, C_{ln}$ of the attribute $A_l$ with respect to the other attributes, to obtain $M_1, M_2, \ldots, M_n$ ($M_i = C_{ki} \times C_{li}$).

Step S2105: $M_k$ and $M_l$ are removed from $M_1, M_2, \ldots, M_n$, and then each one of remaining M is sequentially extracted in a decreasing order of their values.

Step S2106: The subsequent priority order is sequentially assigned to an attribute used in calculating each M, in an order by which each M is extracted. (When $M_i$ is extracted, the next priority order is assigned to an attribute $A_i$).

Next, the second case of assigning priority orders to a plurality of attributes by applying a numerical calculation processing to the correlation coefficients of each attribute with respect to the other attributes and assigning a higher priority order to an attribute which has high correlations with all the attributes comprehensively will be described.

Figure 21:
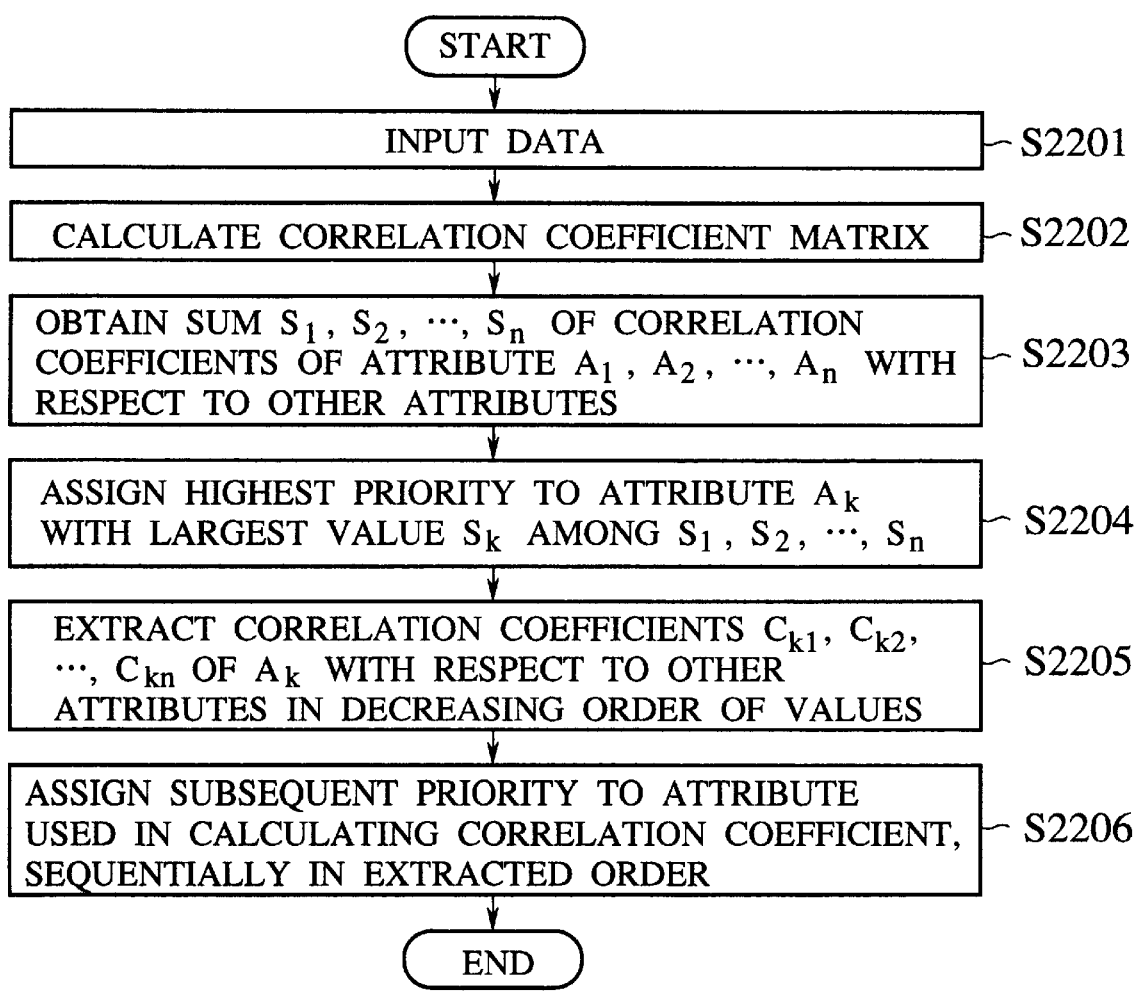
FIG. 21 is a flow chart for an attribute priority order assignment method according to the third embodiment of the present invention for a case using all correlation coefficients comprehensively.

FIG. 21 shows a flow chart for the attribute priority order assignment method using all correlation coefficients comprehensively in this third embodiment, which proceeds as follows.

Step S2201: First, data are entered.

Step S2202: The correlation coefficient matrix is calculated.

Step S2203: For each one of the attributes $A_1, A_2, \ldots, A_n$, a sum $S_1, S_2, \ldots, S_n$ of correlation coefficients with respect to the other attributes is obtained. Here, the sum $S_i$ of the correlation coefficients of an attribute $A_i$ with respect to the other attributes is given as follows.

$$S_i = C_{i1} + C_{i2} + \ldots + C_{in}$$

Step S2204: The highest priority order is assigned to an attribute $A_k$ which has the largest value $S_k$ among the obtained sums $S_1, S_2, \ldots, S_n$.

Step S2205: Each one of the correlation coefficients $C_{k1}, C_{k2}, \ldots, C_{kn}$ of the attribute $A_k$ with respect to the other attributes is extracted sequentially in a decreasing order of their values.

Step S2206: The subsequent priority order is sequentially assigned to an attribute used in calculating each correlation coefficient, in an order by which each correlation coefficient is extracted.

Next, the third case in which a limitation based on a number of attributes to which the priority orders are to be assigned is added to the above described second case of using all correlation coefficients comprehensively will be described.

Figure 22:
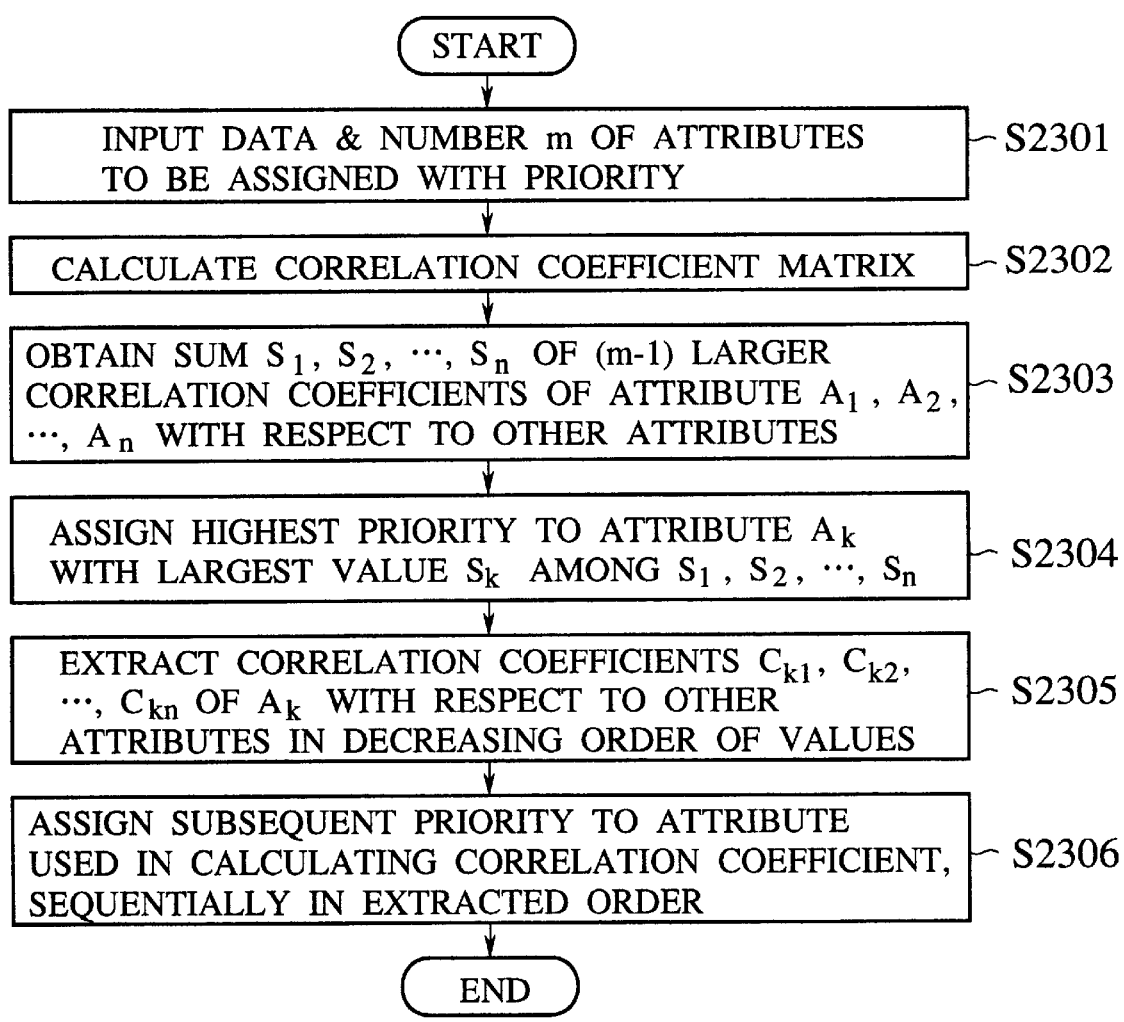
FIG. 22 is a flow chart for an attribute priority order assignment method according to the third embodiment of the present invention for a case using limited correlation coefficients.

FIG. 22 shows a flow chart for the attribute priority order assignment method using limited correlation coefficients in this third embodiment, which proceeds as follows.

Step S2301: First, data and a number m of attributes to which the priority orders are to be assigned are entered.

Step S2302: The correlation coefficient matrix is calculated.

Step S2303: For each one of the attributes $A_1, A_2, \ldots, A_n$, a sum $S_1, S_2, \ldots, S_n$ of (m−1) larger correlation coefficients among correlation coefficients with respect to the other attributes is obtained.

Step S2304: The highest priority order is assigned to an attribute $A_k$ which has the largest value $S_k$ among the obtained sums $S_1, S_2, \ldots, S_n$.

Step S2305: Each one of the correlation coefficients $C_{k1}, C_{k2}, \ldots, C_{kn}$ of the attribute $A_k$ with respect to the other attributes is extracted sequentially in a decreasing order of their values.

Step S2306: The subsequent priority order is sequentially assigned to an attribute used in calculating each correlation coefficient, in an order by which each correlation coefficient is extracted.

Next, the fourth case of assigning priority orders to attributes by using a discrete index which is calculated from a number of attribute value types and a number of records and indicating a continuity of attribute value, in the above described second case of using all correlation coefficients comprehensively will be described.

FIG. 23 shows an exemplary data in a case of obtaining a discrete index τ to be utilized in this fourth case.

For each attribute, the discrete index τ is defined as a number of attribute value types divided by a number of records. For an attribute $A_1$ in the exemplary data shown in FIG. 23, for example, the attribute value has three types of XXX, YYY and ZZZ, and a number of records is eight, so that the discrete index $\tau_1$ is given by ⅜=0.375.

Figure 24:
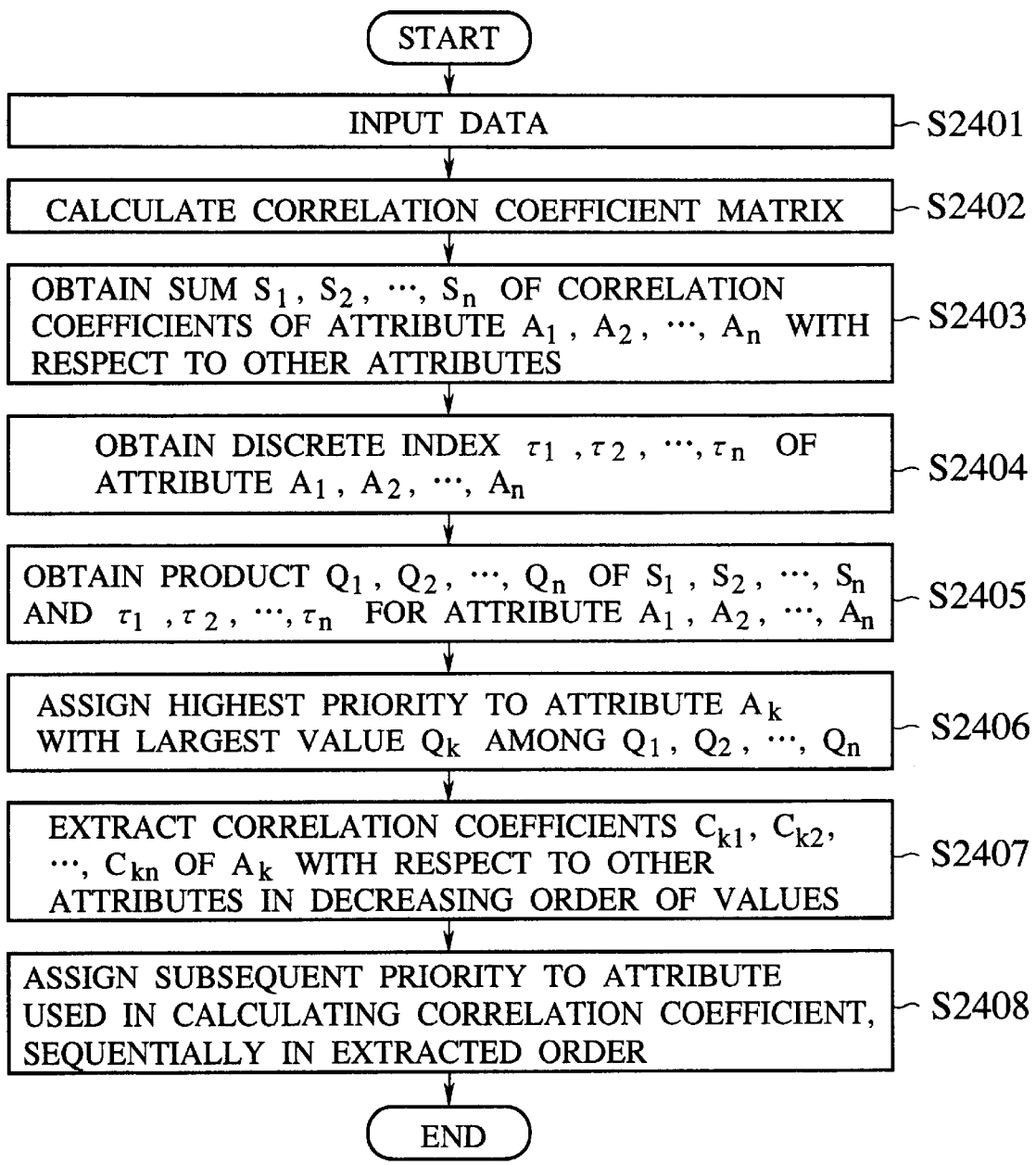
FIG. 24 is a flow chart for an attribute priority order assignment method according to the third embodiment of the present invention for a case using a discrete index.

FIG. 24 shows a flow chart for the attribute priority order assignment method using the discrete index in this third embodiment, which proceeds as follows.

Step S2401: First, data are entered.

Step S2402: The correlation coefficient matrix is calculated.

Step S2403: For each one of the attributes $A_1, A_2, \ldots, A_n$, a sum $S_1, S_2, \ldots, S_n$ of correlation coefficients with respect to the other attributes is obtained. Here, the sum $S_i$ of the correlation coefficients of an attribute $A_i$ with respect to the other attributes is given as follows.

$$S_i = C_{i1} + C_{i2} + \ldots + C_{in}$$

Step S2404: For each one of the attributes $A_1, A_2, A_n$, the discrete index $\tau_1, \tau_2, \ldots, \tau_n$ is obtained.

Step S2405: For each one of the attributes $A_1, A_2, A_n$, a product $Q_1, Q_2, \ldots, Q_n$ of the sum $S_1, S_2, \ldots, S_n$ of the correlation coefficients and the discrete index $\tau_1, \tau_2, \ldots, \tau_n$ is obtained.

Step S2406: The highest priority order is assigned to an attribute $A_k$ which has the largest value $Q_k$ among the obtained products $Q_1, Q_2, \ldots, Q_n$.

Step S2407: Each one of the correlation coefficients $C_{k1}, C_{k2}, \ldots, C_{kn}$ of the attribute $A_k$ with respect to the other attributes is extracted sequentially in a decreasing order of their values.

Step S2408: The subsequent priority order is sequentially assigned to an attribute used in calculating each correlation coefficient, in an order by which each correlation coefficient is extracted.

Next, the fifth case of assigning priority orders to attributes by merging the priority orders determined by the above described first case of using the maximum correlation and the above described second case of using all correlation coefficients comprehensively will be described.

FIG. 25 shows a flow chart for the attribute priority order assignment method merging the maximum correlation based case and the all correlation coefficients based case in this third embodiment, which proceeds as follows.

Step S2501: First, data are entered.

Step S2502: The correlation coefficient matrix is calculated.

Step S2503: The priority orders P1 for a plurality of attributes are obtained by using the attribute priority order assignment method using the maximum correlation, as in the first case described above.

Step S2504: The priority orders P2 for a plurality of attributes are obtained by using the attribute priority order assignment method using all correlation coefficients comprehensively, as in the second case described above.

Step S2505: For each one of the attributes, a sum of P1 and P2 is calculated, and the calculated sum is extracted sequentially in an increasing order of their values.

Step S2506: The priority order is sequentially assigned to an attribute corresponding to each sum, in an order by which each sum is extracted.

Thus, according to this third embodiment, it becomes possible to select attributes which are to be used as data conversion target attributes, by utilizing the correlation coefficient matrix among data attributes as the statistical feature.

As described, according to the present invention, it is possible for the user to try visual expressions based on a feature of the decision tree which is effective in classifying the target attributes, without being required to enter definition, at a time of large quantity multidimensional data analysis. In addition, when a feature or a tendency of the analysis target data is unknown, it is still possible to carry out the analysis according to visual expressions based on the feature of the decision tree for classifying the target attributes.

Also, according to the present invention, it is possible for the user to try visual expressions based on a statistical feature of data, without being required to enter definition, at a time of large quantity multidimensional data analysis. In addition, when a feature or a tendency of the analysis target data is unknown, it is still possible to carry out the analysis according to visual expressions based on the statistical feature. Moreover, it is also possible to reflect the user's intention by allowing the user to select the definition from the visual expressions based on the statistical feature.

Also, according to the present invention, it is possible to automatically select attributes which are to be the visualization targets in the visual multidimensional data analysis tool, by utilizing the correlation coefficient matrix among data attributes, and therefore it becomes possible to assign the priority orders among the attributes according to the correlation coefficient matrix and selecting visualization target attributes from data and a number of attributes to be selected entered by the user at a time of large quantity multidimensional data analysis.

As a result, even when the analysis policy is undecided by the user, it is possible to select a plurality of correlated attributes and use them for trials.

It is to be noted that the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

In particular, any of the processing in the first to third embodiments described above can be conveniently implemented in forms of software package. The program for the processing of the definition generation assistance device of the first or second embodiment may be stored in a storage medium such as a disk device that can be activated according to the need, or stored in a portable storage medium such as floppy disk or CD-ROM that is to be installed into a personal computer of the user at a time of use.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is also to be noted that the expression conditions of FIG. 4 and FIG. 13 used in describing the first and second embodiments are just examples, and types of parameters and their orders given in the mapping column and the data conversion parameter columns may be suitable changed according to the need.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An automatic definition generation device for automatically generating a data conversion definition to be used in an apparatus for converting data stored in database or files into graphic data according to the data conversion definition and displaying the graphic data, the device comprising:

a feature extraction unit for extracting a data feature of the data from the database or files; and a definition generation unit for automatically generating the data conversion definition according to the data feature extracted by the feature extraction unit, the data conversion definition being formed by an attribute mapping definition defining combinations of data attributes and graphic data parameters and a data conversion method definition defining a method for converting a value of each data attribute into a value of a corresponding graphic data parameter;

wherein the feature extraction unit also assigns priority Orders among data attributes to be targets of conversion into graphic data parameters using a prescribed data priority order assignment rule according to the data feature, and automatically derives attribute mapping combination conditions indicating ordered sequences of the data attributes to be targets of conversion into graphic data parameters that give visual expressions.

2. The device of claim 1, wherein the definition generation unit automatically generates the attribute mapping definition that gives a visual expression, using a prescribed expression condition indicating the graphic data parameters to which the data attributes should be set in correspondence at higher priority orders, according to whether a data type of each data attribute to be a target of conversion into graphic data is qualitative or qualitative.

3. The device of claim 2, wherein the graphic data parameters are parameters specifying X-axis, Y-axis, size, color, label and shape of a graphic figure, and the expression condition specifies priority orders among said parameters by which the data attributes are to be set in correspondence to said parameters, said priority orders being different orders depending on whether the data type of each data attribute is quantitative or qualitative.

4. The device of claim 1, wherein the definition generation unit automatically generates the data conversion method definition that gives a visual expression, using a prescribed expression condition indicating conversion methods for converting a value of each data attribute into a value of a corresponding graphic data parameter, according to whether a data type of each data attribute to be a target of conversion into graphic data is quantitative or qualitative.

5. The device of claim 4, wherein the conversion methods includes a conversion by logical arrangement, a conversion by threshold specification, a conversion by uniform division specification, and a conversion by character string specification, and the expression condition specifies the conversion methods to be different methods depending on whether the data type of each data attribute is quantitative or qualitative.

6. The device of claim 1, wherein the feature extraction unit obtains a decision tree for classifying target attributes with respect to the data, and extracts a feature of obtained decision tree as the data feature.

7. The device of claim 6, wherein the feature of the decision tree is a feature regarding vertices of the decision tree, and the data priority order assignment rule sequentially assigns the priority orders from those data attributes which are corresponding to upper level vertices.

8. The device of claim 6, wherein the feature of the decision tree is a feature regarding vertices of the decision tree, and the data priority order assignment rule sequentially assigns the priority orders from those data attributes which are corresponding to lower level vertices.

9. The device of claim 1, wherein the feature extraction unit extracts a statistical feature related to the data as the data feature.

10. The device of claim 9, wherein the statistical feature is a feature regarding factors of the data or quantification theory result corresponding to factors of the data, and the data priority order assignment rule sequentially assigns the priority orders from a first factor among the factors of the data.

11. The device of claim 9, wherein the statistical feature is a feature regarding factor loading of the data or quantification theory result corresponding to factor loading of the data, and the data priority order assignment rule sequentially assigns the priority orders from those data attributes which are contained in a first factor among factors of the data.

12. The device of claim 9, wherein the statistical feature is a feature regarding correlation coefficients among the data attributes or quantification theory result corresponding to correlation coefficients among the data attributes, and the data priority order assignment rule sequentially assigns the priority orders from those data attributes which have higher correlation coefficients among the data.

13. The device of claim 9, wherein the statistical feature is a feature regarding clusters of the data or quantification theory result corresponding to clusters of the data, and the data priority order assignment rule sequentially assigns the priority orders from the clusters in the data.

14. The device of claim 9, wherein the statistical feature is a correlation coefficient matrix indicating correlation coefficients among the data attributes.

15. The device of claim 14, wherein the data priority order assignment rule assigns the priority orders according to a largest correlation coefficient in the correlation coefficient matrix and correlation coefficients of one set of data attributes having said largest correlation coefficient with respect to other data attributes.

16. The device of claim 15, wherein the data priority order assignment rule assigns a highest priority order to said one set of data attributes, calculates a product of each one of correlation coefficients of one of said one set of data attributes with respect to all other data attributes and a corresponding one of correlation coefficients of another one of said one set of data attributes with respect to all other data attributes, eliminates those products which are obtained from correlation coefficients among said one set of data attributes, and sequentially assigns subsequent priority orders to those data attributes for which a value of a product is larger among the other data attributes.

17. The device of claim 14, wherein the data priority order assignment rule sequentially assigns the priority orders from those data attributes which have higher correlations with respect to all the data attributes comprehensively, according to results of numerical calculation processing on correlation coefficients between each data attribute and other data attributes in the correlation coefficient matrix.

18. The device of claim 17, wherein the numerical calculation processing obtains a sum of correlation coefficients of each data attribute with respect to other data attributes, and the data priority order assignment rule assigns a highest priority order to one data attribute for which the sum is largest, and sequentially assigns subsequent priority orders to those data attributes which have the correlation coefficients with respect to said one data attribute that are higher than the correlation coefficients with respect to said one data attribute of other data attributes.

19. The device of claim 18, wherein the numerical calculation processing obtains the sum under a limitation on correlation coefficients to be summed which is depending on a prescribed number of data attributes to which the priority orders are to be assigned.

20. The device of claim 19, wherein the numerical calculation processing obtains the sum by summing as many as said prescribed number minus one pieces of correlation coefficients which have larger values among correlation coefficients of each data attribute with respect to other data attributes.

21. The device of claim 14, wherein the data priority order assignment rule assigns the priority orders according to an index indicating a level of continuity of attribute value, said index being calculated from a total number of attribute value types and a total number of records for each data attribute.

22. The device of claim 21, wherein the data priority order assignment rule obtains a sum of correlation coefficients of each data attribute with respect to other data attributes, obtains the discrete index for each data attribute by dividing the number of attribute value types by the number of record, assigns a highest priority order to one data attribute for which a product of the sum and the discrete index is largest, and sequentially assigns subsequent priority orders to those data attributes which have higher correlation coefficients with respect to said one data attribute.

23. The device of claim 14, wherein the data priority order assignment rule assigns the priority orders by merging a first priority order obtained according to a largest correlation coefficient in the correlation coefficient matrix and correlation coefficients of one set of data attributes having said largest correlation coefficient with respect to all other data attributes, and a second priority order obtained according to results of numerical calculation processing on correlation coefficients between each data attribute and all other data attributes in the correlation coefficient matrix.

24. The device of claim 23, wherein the data priority order assignment rule sequentially assigns the priority orders from those data attributes for which a sum of the first priority order and the second priority order is smaller among the data attributes.

25. An automatic definition generation method for automatically generating a data conversion definition to be used in an apparatus for converting data stored in database or files into graphic data according to the data conversion definition and displaying the graphic data, the method comprising the steps of:

extracting a data feature of the data from the database or files; and automatically generating the data conversion definition according to the data feature extracted by the extracting stop, the data conversion definition being formed by an attribute mapping definition defining combinations of data attributes and graphic data parameters and a data conversion method definition defining a method for converting a value of each data attribute into a value of a corresponding graphic data parameter;

wherein the extracting step also assigns priority orders among data attributes to be targets of conversion into graphic data parameters using a prescribed data priority order assignment rule according to the data feature, and automatically derives attribute mapping combination conditions indicating ordered sequences of the data attributes to be targets of conversion Into graphic data parameters that give visual expressions.

26. The method of claim 25, wherein the automatically generating step automatically generates the attribute mapping definition that gives a visual expression, using a prescribed expression condition indicating the graphic data parameters to which the data attributes should be set in correspondence at higher priority orders, according to whether a data type of each data attribute to be a target of conversion into graphic data is quantitative or qualitative.

27. The method of claim 26, wherein the graphic data parameters are parameters specifying X-axis, Y-axis, size, color, label and shape of a graphic figure, and the expression condition specifies priority orders among said parameters by which the data attributes are to be set in correspondence to said parameters, said priority orders being different orders depending on whether the data type of each data attribute is quantitative or qualitative.

28. The method of claim 25, wherein the automatically generating step automatically generates the data conversion method definition that gives a visual expression, using a prescribed expression condition indicating conversion methods for converting a value of each data attribute into a value of a corresponding graphic data parameter, according to whether a data type of each data attribute to be a target of conversion into graphic data is quantitative or qualitative.

29. The method of claim 28, wherein the conversion methods includes a conversion by logical arrangement, a conversion by threshold specification, a conversion by uniform division specification, and a conversion by character string specification, and the expression condition specifies the conversion methods to be different methods depending on whether the data type of each data attribute is quantitative or qualitative.

30. The method of claim 25, wherein the extracting stop obtains a decision tree for classifying target attributes with respect to the data, and extracts a feature of obtained decision tree as the data feature.

31. The method of claim 30, wherein the feature of the decision tree is a feature regarding vertices of the decision tree, and the data priority order assignment rule sequentially assigns the priority orders from those data attributes which are corresponding to upper level vertices.

32. The method of claim 30, wherein the feature of the decision tree is a feature regarding vertices of the decision tree, and the data priority order assignment rule sequentially assigns the priority orders from those data attributes which are corresponding to lower level vertices.

33. The method of claim 25, wherein the extracting step extracts a statistical feature related to the data as the data feature.

34. The method of claim 33, wherein the statistical feature is a feature regarding factors of the data or quantification theory result corresponding to factors of the data, and the data priority order assignment rule sequentially assigns the priority orders from a first factor among the factors of the data.

35. The method of claim 33, wherein the statistical feature is a feature regarding factor loading of the data or quantification theory result corresponding to factor loading of the data, and the data priority order assignment rule sequentially assigns the priority orders from those data attributes which are contained in a first factor among factors of the data.

36. The method of claim 33, wherein the statistical feature is a feature regarding correlation coefficients among the data attributes or quantification theory result corresponding to correlation coefficients among the data attributes, and the data priority order assignment rule sequentially assigns the priority orders from those data attributes which have higher correlation coefficients among the data.

37. The method of claim 33, wherein the statistical feature is a feature regarding clusters of the data or quantification theory result corresponding to clusters of the data, and the data priority order assignment rule sequentially assigns the priority orders from the clusters in the data.

38. The method of claim 33, wherein the statistical feature is a correlation coefficient matrix indicating correlation coefficients among the data attributes.

39. The method of claim 38, wherein the data priority order assignment rule assigns the priority orders according to a largest correlation coefficient in the correlation coefficient matrix and correlation coefficients of one set of data attributes having said largest correlation coefficient with respect to other data attributes.

40. The method of claim 39, wherein the data priority order assignment rule assigns a highest priority order to said one set of data attributes, calculates a product of each one of correlation coefficients of one of said one set of data attributes with respect to all other data attributes and a corresponding one of correlation coefficients of another one of said one set of data attributes with respect to all other data attributes, eliminates those products which are obtained from correlation Coefficients among said one set of data attributes, and sequentially assigns subsequent priority orders to those data attributes for which a value of a product is larger among the other data attributes.

41. The method of claim 38, wherein the data priority order assignment rule sequentially assigns the priority orders from those data attributes which have higher correlations with respect to all the data attributes comprehensively, according to results of numerical calculation processing on correlation coefficients between each data attribute and other data attributes in the correlation coefficient matrix.

42. The method of claim 41, wherein the numerical calculation processing obtains a sum of correlation coefficients of each data attribute with respect to other data attributes, and the data priority order assignment rule assigns a highest priority order to one data attribute for which the sum is largest, and sequentially assigns subsequent priority orders to those data attributes which have the correlation coefficients with respect to said one data attribute that are higher than the correlation coefficients with respect to said one data attribute of other data attributes.

43. The method of claim 42, wherein the numerical calculation processing obtains the sum under a limitation on correlation coefficients to be summed which is depending on a prescribed number of data attributes to which the priority orders are to be assigned.

44. The method of claim 43, wherein the numerical calculation processing obtains the sum by summing as many as said prescribed number minus one pieces of correlation coefficients which have larger values among correlation coefficients of each data attribute with respect to other data attributes.

45. The method of claim 38, wherein the data priority order assignment rule assigns the priority orders according to, an index indicating a level of continuity of attribute value, said index being calculated from a total number of attribute value types and a total number of records for each data attribute.

46. The method of claim 45, wherein the data priority order assignment rule obtains a sum of correlation coefficients of each data attribute with respect to other data attributes, obtains the discrete index for each data attribute by dividing the number of attribute value types by the number of record, assigns a highest priority order to one data attribute for which a product of the sum and the discrete index is largest, and sequentially assigns subsequent priority orders to those data attributes which have higher correlation coefficients with respect to said one data attribute.

47. The method of claim 38, wherein the data priority order assignment rule assigns the priority orders by merging a first priority order obtained according to a largest correlation coefficient in the correlation coefficient matrix and correlation coefficients of one set of data attributes having said largest correlation coefficient with respect to all other data attributes, and a second priority order obtained according to results of numerical calculation processing on correlation coefficients between each data attribute and all other data attributes in the correlation coefficient matrix.

48. The method of claim 47, wherein the data priority order assignment rule sequentially assigns the priority orders from those data attributes for which a sum of the first priority order and the second priority order is smaller among the data attributes.

49. An article of manufacture, comprising:
a computer usable medium having computer readable program code means embodied therein for causing a computer to function as an automatic definition generation system for automatically generating a data conversion definition to be used In an apparatus for converting data stored in database or files into graphic data according to the data conversion definition and displaying the graphic data, the computer readable program code means includes: first computer readable program code means for causing said computer to extract a data feature of the data from the database or files; and second computer readable program code means for causing said computer to automatically generate the data conversion definition according to the data feature extracted by the first computer readable program code means, the data conversion definition being formed by an attribute mapping definition defining combinations of data attributes and graphic data parameters and a data conversion method definition defining a method for converting a value of each data attribute into a value of a corresponding graphic data parameter; wherein the first computer readable program code means also assigns priority orders among data attributes to be targets of conversion into graphic data parameters using a prescribed data priority order assignment rule according to the data feature, and automatically derives attribute mapping combination conditions indicating ordered sequences of the data attributes to be targets of conversion into graphic data parameters that give visual expressions.

50. The article of manufacture of claim 49, wherein the second computer readable program code means automatically generates the attribute mapping definition that gives a visual expression, using a prescribed expression condition indicating the graphic data parameters to which the data attributes should be set in correspondence at higher priority orders, according to whether a data type of each data attribute to be a target of conversion into graphic data is quantitative or qualitative.

51. The article of manufacture of claim 50, wherein the graphic data parameters are parameters specifying X-axis, Y-axis, size, color, label and shape of a graphic figure, and the expression condition specifies priority orders among said parameters by which the data attributes are to be set in correspondence to said parameters, said priority orders being different orders depending on whether the data type of each data attribute is quantitative or qualitative.

52. The article of manufacture of claim 49, wherein the second computer readable program code means automatically generates the data conversion method definition that gives a visual expression, using a prescribed expression condition indicating conversion methods for converting a value of each data attribute into a value of a corresponding graphic data parameter, according to whether a data type of each data attribute to be a target of conversion into graphic data is quantitative or qualitative.

53. The article of manufacture of claim 52, wherein the conversion methods includes a conversion by logical arrangement, a conversion by threshold specification, a conversion by uniform division specification, and a conversion by character string specification, and the expression condition specifies the conversion methods to be different methods depending on whether the data type of each data attribute is quantitative or qualitative.

54. The article of manufacture of claim 49, wherein the first computer readable program code means obtains a decision tree for classifying target attributes with respect to the data, and extracts a feature of obtained decision tree as the data feature.

55. The article of manufacture of claim 54, wherein the feature of the decision tree is a feature regarding vertices of the decision tree, and the data priority order assignment rule sequentially assigns the priority orders from those data attributes which are corresponding to upper level vertices.

56. The article of manufacture of claim 54, wherein the feature of the decision tree is a feature regarding vertices of the decision tree, and the data priority order assignment rule sequentially assigns the priority orders from those data attributes which are corresponding to lower level vertices.

57. The article of manufacture of claim 49, wherein the first computer readable program code means extracts a statistical feature related to the data as the data feature.

58. The article of manufacture of claim 57, wherein the statistical feature is a feature regarding factors of the data or quantification theory result corresponding to factors of the data, and the data priority order assignment rule sequentially assigns the priority orders from a first factor among the factors of the data.

59. The article of manufacture of claim 57, wherein the statistical feature is a feature regarding factor loading of the data or quantification theory result corresponding to factor loading of the data, and the data priority order assignment rule sequentially assigns the priority orders from those data attributes which are contained in a first factor among factors of the data.

60. The article of manufacture of claim 57, wherein the statistical feature is a feature regarding correlation coefficients among the data attributes or quantification theory result corresponding to correlation coefficients among the data attributes, and the data priority order assignment rule sequentially assigns the priority orders from those data attributes which have higher correlation coefficients among the data.

61. The article of manufacture of claim 57, wherein the statistical feature is a feature regarding clusters of the data or quantification theory result corresponding to clusters of the data, and the data priority order assignment rule sequentially assigns the priority orders from the clusters in the data.

62. The article of manufacture of claim 57, wherein the statistical feature is a correlation coefficient matrix indicating correlation coefficients among the data attributes.

63. The article of manufacture of claim 62, wherein the data priority order assignment rule assigns the priority orders according to a largest correlation coefficient in the correlation coefficient matrix and correlation coefficients of one set of data attributes having said largest correlation coefficient with respect to other data attributes.

64. The article of manufacture of claim 63, wherein the data priority order assignment rule assigns a highest priority order to said one set of data attributes, calculates a product of each one of correlation coefficients of one of said one set of data attributes with respect to all other data attributes and a corresponding one of correlation coefficients of another one of said one set of data attributes with respect to all other data attributes, eliminates those products which are obtained from correlation coefficients among said one set of data attributes, and sequentially assigns subsequent priority orders to those data attributes for which a value of a product is larger among the other data attributes.

65. The article of manufacture of claim 62, wherein the data priority order assignment rule sequentially assigns the priority orders from those data attributes which have higher correlations with respect to all the data attributes comprehensively, according to results of numerical calculation processing on correlation coefficients between each data attribute and other data attributes in the correlation coefficient matrix.

66. The article of manufacture of claim 65, wherein the numerical calculation processing obtains a sum of correlation coefficients of each data attribute with respect to other data attributes, and the data priority order assignment rule assigns a highest priority order to one data attribute for which the sum is largest, and sequentially assigns subsequent priority orders to those data attributes which have the correlation coefficients with respect to said one data attribute that are higher than the correlation coefficients with respect to said one data attribute of other data attributes.

67. The article of manufacture of claim 66, wherein the numerical calculation processing obtains the sum under a limitation on correlation coefficients to be summed which is depending on a prescribed number of data attributes to which the priority orders are to be assigned.

68. The article of manufacture of claim 67, wherein the numerical calculation processing obtains the sum by summing as many as said prescribed number minus one pieces of correlation coefficients which have larger values among correlation coefficients of each data attribute with respect to other data attributes.

69. The article of manufacture of claim 62, wherein the data priority order assignment rule assigns the priority orders according to an index indicating a level of continuity of attribute value, said index being calculated from a total number of attribute value types and a total number of records for each data attribute.

70. The article of manufacture of claim 69, wherein the data priority order assignment rule obtains a sum of correlation coefficients of each data attribute with respect to other data attributes, obtains the discrete index for each data attribute by dividing the number of attribute value types by the number of record, assigns a highest priority order to one data attribute for which a product of the sum and the discrete index is largest, and sequentially assigns subsequent priority orders to those data attributes which have higher correlation coefficients with respect to said one data attribute.

71. The article of manufacture of claim 62, wherein the data priority order assignment rule assigns the priority orders by merging a first priority order obtained according to a largest correlation coefficient in the correlation Coefficient matrix and correlation coefficients of one set of data attributes having said largest correlation coefficient with respect to all other data attributes, and a second priority order obtained according to results of numerical calculation processing on correlation coefficients between each data attribute and all other data attributes in the correlation coefficient matrix.

72. The article of manufacture of claim 71, wherein the data priority order assignment rule sequentially assigns the priority orders from those data attributes for which a sum of the first priority order and the second priority order is smaller among the data attributes.

* * * * *